(12) United States Patent
Nishida et al.

(10) Patent No.: US 8,103,663 B2
(45) Date of Patent: Jan. 24, 2012

(54) ADVERTISING MEDIUM DETERMINATION DEVICE AND METHOD THEREFOR

(75) Inventors: Satoshi Nishida, Osaka (JP); Shigetaka Yamakawa, Osaka (JP); Mieko Sugihara, Osaka (JP); Keita Manabe, Osaka (JP); Jun Hasegawa, Osaka (JP); Yutaka Kamoshita, Osaka (JP); Hideaki Haruta, Tokyo (JP); Yoshifumi Morita, Tokyo (JP)

(73) Assignee: Dentsu Inc., Tokyo (JP)

( * ) Notice: Subject to any disclaimer, the term of this patent is extended or adjusted under 35 U.S.C. 154(b) by 384 days.

(21) Appl. No.: 12/518,817

(22) PCT Filed: Sep. 26, 2008

(86) PCT No.: PCT/JP2008/067493
§ 371 (c)(1),
(2), (4) Date: Jun. 11, 2009

(87) PCT Pub. No.: WO2009/116198
PCT Pub. Date: Sep. 24, 2009

(65) Prior Publication Data
US 2011/0035400 A1    Feb. 10, 2011

(30) Foreign Application Priority Data
Mar. 21, 2008  (JP) ................. 2008-073222

(51) Int. Cl.
*G06F 17/30*   (2006.01)

(52) U.S. Cl. ........ 707/723; 707/725; 707/737; 707/752; 707/769

(58) Field of Classification Search .................. 707/723, 707/725, 737, 752, 769
See application file for complete search history.

(56) References Cited

FOREIGN PATENT DOCUMENTS

| | | |
|---|---|---|
| JP | 2003-196301 | 7/2003 |
| WO | WO 2005/064511 | 7/2005 |
| WO | WO 2005/064511 A1 | 7/2005 |

OTHER PUBLICATIONS

PCT International Preliminary Report on Patentability and Written Opinion, PCT/JP2008/067493, (11 pages).
Article entitled "Computerworld", pp. 70-77, Jun. 1, 2005.

*Primary Examiner* — Shahid Alam
*Assistant Examiner* — Andalib Lodhi
(74) *Attorney, Agent, or Firm* — Edell, Shapiro & Finnan, LLC

(57) ABSTRACT

It is also an object of the present invention to provide objective advertisement plan(s). The target specifying information storage part 202 stores information for specifying target attribution including information for specifying information delivery medium of an object to contact with correspondently with searchers' ID. The search term storage part 203 correspondently stores a searcher's ID, the timing of search, and the term used for the search. The extraction part 204 extracts the timing of search for such search term for each searcher's ID, segments the extracted search timing for each searcher's ID into a predetermined number in chronological order and then extracts searcher's ID belonging to each segment. The advertising medium data determination part 205 extracts information on candidate of information delivery medium for the each segment from the extracted each searcher's ID using information for specifying a target and determines candidate(s) of information delivery medium from the extracted candidate of information delivery medium.

17 Claims, 53 Drawing Sheets

FIG.3

| USER IDS | TIMING OF SEARCHES | SEARCH TERMS |
|---|---|---|
| 10001 | 2007/4/1 06:00 | SONY |
| ⋮ | ⋮ | ⋮ |
| 10011 | 2007/4/2 06:01 | TSUBAKI |
| ⋮ | ⋮ | ⋮ |
| 10004 | 2007/4/3 14:31 | NINTENDO |
| ⋮ | ⋮ | ⋮ |
| 12303 | 2007/4/5 16:22 | TSUBAKI |
| ⋮ | ⋮ | ⋮ |
| 10013 | 2007/4/5 16:24 | TSUBAKI |
| 10024 | 2007/4/5 19:10 | TSUBAKI |

FIG.4

| USER IDS | GENDER | AGE | ... | PAY ATTENTION ON FASHION | PAY ATTENTION ON HEALTH | SENSITIVE TO FASHION | ... | MAGAZINE A | MAGAZINE B | MAGAZINE C | ... |
|---|---|---|---|---|---|---|---|---|---|---|---|
| 10001 | MALE | 23 | ... | 1 | 0 | 1 | ... | 0 | 1 | 0 | ... |
| 10002 | MALE | 51 | ... | 0 | 1 | 0 | ... | 1 | 0 | 0 | ... |
| 10003 | FEMALE | 34 | ... | 0 | 1 | 1 | ... | 0 | 0 | 1 | ... |
| 10004 | MALE | 21 | ... | 1 | 0 | 1 | ... | 0 | 0 | 0 | ... |
| 10005 | FEMALE | 24 | ... | 0 | 1 | 1 | ... | 0 | 1 | 1 | ... |
| 10006 | MALE | 39 | ... | 1 | 0 | 0 | ... | 0 | 0 | 0 | ... |
| 10007 | FEMALE | 42 | ... | 0 | 0 | 0 | ... | 0 | 0 | 0 | ... |
| ... | | | | | | | | | | | |

| TV PROGRAM A | TV PROGRAM B | ... | COMPUTER A | DRINK A | ... |
|---|---|---|---|---|---|
| 1 | 1 | ... | 1 | 1 | ... |
| 0 | 1 | ... | 0 | 0 | ... |
| 0 | 0 | ... | 0 | 0 | ... |
| 1 | 0 | ... | 1 | 1 | ... |
| 1 | 1 | ... | 0 | 0 | ... |
| 0 | 1 | ... | 1 | 0 | ... |
| 0 | 1 | ... | 0 | 0 | ... |
| ... | | | | | |

FIG.5

| DATE AND HOUR | NUMBER OF SEARCH RESPONDENT | USER IDS |
|---|---|---|
| 2007/4/2 | 1 | 10011 |
| 2007/4/5 | 3 | 12303,10013,10024 · · · |
| 2007/4/6 | | |
| ⋮ | ⋮ | ⋮ |

FIG.6

| NAME OF ENTERPRISES · PRODUCTS | NAME OF PLAN | SEARCH TERM · PRODUCT CATEGORY USED FOR PLAN |
|---|---|---|
| SHAMPOO X | PLAN A | TSUBAKI |
| COFFEE A | PLAN B | COFFEE X & COFFEE Y |
| COFFEE A | PLAN C | COFFEE X |
| COFFEE B | PLAN D | COFFEE Z |
| --- | --- | --- |

FIG.7

| PERIOD | C1 | C2 | C3 | C4 | C5 | TOTAL |
|---|---|---|---|---|---|---|
| | 2008/5/1 | 2008/6/2 | 2008/7/1 | 2008/7/19 | 2008/7/31 | 2008/5/1 |
| | ~ | ~ | ~ | ~ | ~ | ~ |
| | 2008/6/1 | 2008/6/30 | 2008/7/18 | 2008/7/30 | 2008/9/22 | 2008/9/22 |
| | DAY 1 | DAY 33 | DAY 62 | DAY 80 | DAY 92 | DAY 1 |
| | ~ | ~ | ~ | ~ | ~ | ~ |
| | DAY 32 | DAY 61 | DAY 79 | DAY 91 | DAY 145 | DAY 145 |

| MAGAZINES | MAGAZINE A | MAGAZINE C | MAGAZINE I | MAGAZINE K | MAGAZINE M | |
|---|---|---|---|---|---|---|
| | MAGAZINE B | | | MAGAZINE M | MAGAZINE K | |
| | | | | | MAGAZINE O | |
| TOTAL BUDGET FOR MAGAZINES | ------ | ------ | ------ | ------ | ------ | ------ |

FIG. 12

TABULATION RESULT

TABULATION SEGMENTS: 5 SEGMENTS   TIME PERIOD OF TABULATION 2007/4/2~2007/8/24

| | | C1 | C2 | C3 | C4 | C5 |
|---|---|---|---|---|---|---|
| TIME FRAMES | | 2008/5/1 ~ 2008/6/1 | 2008/6/2 ~ 2008/6/30 | 2008/7/1 ~ 2008/7/18 | 2008/7/19 ~ 2008/7/30 | 2008/7/31 ~ 2008/9/22 |
| | | DAY 1 ~ DAY 32 | DAY 33 ~ DAY 61 | DAY 62 ~ DAY 79 | DAY 80 ~ DAY 91 | DAY 92 ~ DAY 145 |
| DAYS | | 32 | 29 | 18 | 12 | 54 |
| CUMULATIVE DAYS | | 32 | 61 | 79 | 91 | 145 |
| NUMER OF SEARCH | | 1,264 | 1,264 | 1,264 | 1,264 | 1,264 |
| CUMULATIVE SEARCH NUMBER | | 1,264 | 2,528 | 3,792 | 5,056 | 6,320 |
| SEARCH RATIOS (SEARCHER BASE) | | 20.0% | 20.0% | 20.0% | 20.0% | 20.0% |
| CUMULATIVE SEARCH RATIOS (SEARCHER BASE) | | 20.0% | 40.0% | 60.0% | 80.0% | 100.0% |
| SEARCH RATIOS | | 7.2% | 7.2% | 7.2% | 7.2% | 7.2% |
| CUMULATIVE SEARCH RATIOS | | 7.2% | 14.4% | 21.6% | 28.8% | 36.0% |

TABULATION RESULT

TABULATION RESULT

TABULATED SEGMENTS : 5 SEGMENTS　　ACCESSED MAGAZINE ▼

DISPLAY METHOD OF RANKING
- ○ CONSIDER COST
- ● NOT CONSIDER COST

DISPLAY METHOD OF MARKING
- ● OVERALL MEAN　　3%　　EQUAL OR MORE THAN ▼
- ○ DEVIATION VALUE
- ○ ...

| | | C1 | | C2 | | | C3 | | | C4 | | | C5 | | |
|---|---|---|---|---|---|---|---|---|---|---|---|---|---|---|---|
| SE-LECT (S) | NAME OF MAGA-ZINE (NOM) | CONTACT FRE-QUENCY RATIO (%)(CFR) | DIFFER-ENCE FROM AVER-AGE (%)(DFA) | (S)(NOM) | (CFR)(%) | (DFA)(%) | (S)(NOM) | (CFR)(%) | (DFA)(%) | (S)(NOM) | (CFR)(%) | (DFA)(%) | (S)(NOM) | (CFR)(%) | (DFA)(%) |
| 1 | ● | MAGAZINE A | 12.3 | +5.4 | ● C | 10.5 | +3.7 | ● I | 15.2 | +5.2 | K | 10.8 | | M | 10.2 | |
| 2 | ● | MAGAZINE B | 10.5 | +6.2 | F | 9.8 | | F | 9.7 | | M | 10.2 | | K | 10.5 | |
| 3 | | MAGAZINE C | 7.5 | | G | 8.2 | | J | 9.5 | | I | 7.5 | | ● O | 4.8 | +3.1 |
| 4 | | MAGAZINE D | 4.5 | | B | 4.5 | | K | 8.4 | | F | 4.5 | | J | 4.5 | |
| 5 | | MAGAZINE E | 2.5 | | H | 3.2 | | L | 8.3 | | O | 2.5 | | I | 4.2 | |
| 6 | | | | | | | | | | | | | | | | |

ADD PLAN

FIG.14

TABULATION RESULT

TABULATION RESULT

TABULATED SEGMENTS : 5 SEGMENTS    ACCESSED MAGAZINE ▼

DISPLAY METHOD OF RANKING
○ CONSIDER COST
● NOT CONSIDER COST

DISPLAY METHOD OF MARKING
● OVERALL MEAN       3%
○ DEVIATION VALUE
○ ........            EQUAL OR MORE THAN ▼

| SE-LECT (S) | NAME OF MAGA-ZINE (NOM) | CONTACT FRE-QUENCY RATIO (%)(CFR) | DIFFER-ENCE FROM AVER-AGE (%)(DFA) | C1 (S)(NOM) | C2 (S)(NOM) | C2 (CFR) (%) | C2 (DFA) (%) | C3 (S)(NOM) | C3 (CFR) (%) | C3 (DFA) (%) | C4 (S)(NOM) | C4 (CFR) (%) | C4 (DFA) (%) | C5 (S)(NOM) | C5 (CFR) (%) | C5 (DFA) (%) |
|---|---|---|---|---|---|---|---|---|---|---|---|---|---|---|---|---|
| 1 | MAGA-ZINE A | 12.3 | +5.4 | ● | C | 10.5 | +3.7 | I | 15.2 | +5.2 | K | 10.8 | | M | 10.2 | |
| 2 | MAGA-ZINE B | 10.5 | +6.2 | ● | F | 9.8 | | F | 9.7 | | M | 10.2 | | K | 10.5 | |
| 3 | MAGA-ZINE C | 7.5 | | | G | 8.2 | | J | 9.5 | | I | 7.5 | | O | 4.8 | +3.1 |
| 4 | MAGA-ZINE D | 4.5 | | | B | 4.5 | | K | 8.4 | | F | 4.5 | | J | 4.5 | |
| 5 | MAGA-ZINE E | 2.5 | | | H | 3.2 | | L | 8.3 | | O | 2.5 | | I | 4.2 | |
| 6 | | | | | | | | | | | | | | | | |

ADD PLAN

| DRAFT OF MEDIA PLAN (PLAN A) | | | | | | |
|---|---|---|---|---|---|---|
| BEGINNING PERIOD OF CAMPAIGN | 2008/5/01 | | ADVERTISING OBJECT: SHAMPOO X | | SEARCH OBJECT TERM: TSUBAKI | |
| | | C1 | C2 | C3 | C4 | C5 | TOTAL |
| TIME FRAMES | | 2008/5/1 | 2008/6/2 | 2008/7/1 | 2008/7/19 | 2008/7/31 | 2008/5/1 |
| | | 2008/6/1 | 2008/6/30 | 2008/7/18 | 2008/7/30 | 2008/9/22 | 2008/9/22 |
| | | DAY 1 ~ DAY 32 | DAY 33 ~ DAY 61 | DAY 62 ~ DAY 79 | DAY 80 ~ DAY 91 | DAY 92 ~ DAY 145 | DAY 1 ~ DAY 145 |
| MAGAZINES | | MAGAZINE A | MAGAZINE C | MAGAZINE I | MAGAZINE K | MAGAZINE M | |
| | | MAGAZINE B | | | MAGAZINE M | MAGAZINE K | |
| | | ---- | ---- | ---- | ---- | MAGAZINE O | ---- |
| TOTAL BUDGET FOR MAGAZINES | | | | | | | |
| TOTAL BUDGET | | | | | | | |

FIG.20

| DATE AND HOUR | NUMBER OF SEARCH RESPONDENTS | RESPONDENTS' IDS |
|---|---|---|
| 2007/5/1 | 1 | 65987 |
| 2007/5/2 | 24 | 33303,45113,65324··· |
| 2007/5/3 | 120 | 59632,25634··· |

FIG.22

| LARGE CLASSIFICATION | SMALL CLASSIFICATION | SEARCH TERMS |
|---|---|---|
| COSMETICS · TOILETRY | SHAMPOO | TSUBAKI |
| COSMETICS · TOILETRY | SHAMPOO | ASIENCE |
| COSMETICS · TOILETRY | SHAMPOO | ---- |
| COSMETICS · TOILETRY | CONDITIONER | ---- |
| COSMETICS · TOILETRY | CONDITIONER | ---- |
| DRUGS AND MEDICINES | ---- | ---- |

FIG.25

CALCULATION OF SIMILARITY AND DETERMINATION OF SEARCH ITEM

SETUP FOR METHOD OF CALCULATING SIMILARITY

- ○ EUCLIDEAN DISTANCE  ● CORRELATION FACTOR
- ○ SQUARE SUM  ○ ....
- ○ ....

[CALCULATE ↓]

SEARCH TERM TO BE ANALYSIS OBJECT

SHAMPOO X

| SEARCH TERMS | SIMILARITY | CORRELATION FACTOR | SIMILARITY | |
|---|---|---|---|---|
| SHAMPOO Y1 | 0.23 | | | ○ USED FOR PREDICTION · CORRECTION OF PLAN |
| SHAMPOO Y5 | 0.18 | | | ○ USED FOR PREDICTION · CORRECTION OF PLAN |
| SHAMPOO Y6 | 0.88 | | | ● USED FOR PREDICTION · CORRECTION OF PLAN |
| | | | | ○ USED FOR PREDICTION · CORRECTION OF PLAN |

[SELECT SEARCH TERM]

FIG. 27

DRAFT OF MEDIA PLAN (PLAN A)

BEGINNING PERIOD OF CAMPAIGN: 2008/6/20  ADVERTISING OBJECT: SHAMPOO X  SEARCH OBJECT TERM: SHAMPOO Y6

ORIGINAL PLAN: PLAN A

| | C1 | C2 | C3 | C4 | C5 | TOTAL |
|---|---|---|---|---|---|---|
| TIME FRAMES | 2008/5/1 ~ 2008/6/1 DAY 1 ~ DAY 32 | 2008/6/2 ~ 2008/6/30 DAY 33 ~ DAY 61 | 2008/7/1 ~ 2008/7/18 DAY 62 ~ DAY 79 | 2008/7/19 ~ 2008/7/30 DAY 80 ~ DAY 91 | 2008/7/31 ~ 2008/9/22 DAY 92 ~ DAY 145 | 2008/5/1 ~ 2008/9/22 DAY 1 ~ DAY 145 |
| MAGAZINES | MAGAZINE A MAGAZINE B | MAGAZINE C | MAGAZINE I | MAGAZINE M | MAGAZINE K MAGAZINE M MAGAZINE O | |
| TOTAL BUDGET FOR MAGAZINES | ---- | ---- | ---- | ---- | ---- | ---- |

CORRECTION PLAN

| | C1 | C2 | C3 | TOTAL |
|---|---|---|---|---|
| TIME FRAMES | | 2008/6/20 ~ 2008/7/30 DAY 1 ~ DAY 42 | 2008/7/31 ~ 2009/1/18 DAY 43 ~ DAY 213 | 2008/6/20 ~ 2009/1/18 DAY 1 ~ DAY 213 |
| MAGAZINES | MAGAZINE A MAGAZINE B | MAGAZINE H MAGAZINE C | MAGAZINE F | |
| TOTAL BUDGET FOR MAGAZINES | ---- | ---- | ---- | ---- |

FIG. 28

DRAFT OF MEDIA PLAN

| BEGINNING PERIOD OF CAMPAIGN | 2008/6/20 | ADVERTISING OBJECT: SHAMPOO X | | SEARCH OBJECT TERM: SHAMPOO Y6 | |

ORIGINAL PLAN: PLAN A
CORRECTION PLAN

| | C1 | C2 | C2' | C3' | TOTAL |
|---|---|---|---|---|---|
| TIME FRAMES | 2008/5/1 ~ 2008/6/1 | 2008/6/2 ~ 2008/6/30 | 2008/6/20 ~ 2008/7/30 | 2008/7/31 ~ 2009/1/18 | 2008/5/1 ~ 2009/1/18 |
| | DAY 1 ~ DAY 32 | DAY 33 ~ DAY 61 | DAY 51 ~ DAY 91 | DAY 92 ~ DAY 263 | DAY 1 ~ DAY 263 |
| MAGAZINES | MAGAZINE A | MAGAZINE C | MAGAZINE H | MAGAZINE F | |
| | MAGAZINE B | | MAGAZINE C | | |
| | -------- | -------- | -------- | -------- | -------- |
| TOTAL BUDGET FOR MAGAZINES | | | | | |

FIG.31

SETUP FOR AUTOMATIC SEGMENT CONDITION

TABULATION UNIT
○ DAY ◉ WEEK ○ MONTH ○ ARBITRARY DESIGNATION

RISING POINT
SETUP FOR TIME DURATION
3 WEEKS ▶
SETUP FOR RISING CONDITION AGAINST
OVERALL CUMULATIVE DISTRIBUTIONS ▶
RISE IN EQUAL OR MORE THAN
0.5% ▶

DROPPING POINT
SETUP FOR TIME DURATION
3 WEEKS ▶
SETUP FOR DROPPING CONDITION AGAINST
OVERALL CUMULATIVE DISTRIBUTIONS ▶
RISE IN EQUAL OR MORE THAN
0.5% ▶

MOVING AVERAGE
◉ EXIST ○ NOT EXIST
CALCULATION METHOD OF MOVING AVERAGE
◉ PREVIOUS N WEEKS  4 ▶ WEEK AVERGE
○ PREVIOUS/POST N WEEKS

CALCULATE

FIG.32

| | | SEARCH NUMBER | SEARCH RATIOS (SEARCHER BASE) | SEARCH NUMBER MOVING AVERAGE *(AVERAGE OF PREVIOUS FOUR WEEKS) | SEARCH NUMBER MOVING AVERAGE DIFFERENCE FROM PREVIOUS WEEK |
|---|---|---|---|---|---|
| 2007/1/29 | WEEK 1 | 15 | 0.0% | 15 | |
| 2007/2/5 | WEEK 2 | 452 | 1.2% | 234 | 219 |
| 2007/2/12 | WEEK 3 | 24 | 0.1% | 164 | -70 |
| 2007/2/19 | WEEK 4 | 12 | 0.0% | 126 | -38 |
| 2007/2/26 | WEEK 5 | 17 | 0.0% | 126 | 1 |
| 2007/3/5 | WEEK 6 | 24 | 0.1% | 19 | -107 |
| 2007/3/12 | WEEK 7 | 117 | 0.3% | 43 | 23 |
| 2007/3/19 | WEEK 8 | 198 | 0.5% | 89 | 47 |
| 2007/3/26 | WEEK 9 | 239 | 0.6% | 145 | 56 |
| 2007/4/2 | WEEK 10 | 835 | 2.2% | 347 | 203 |
| 2007/4/9 | WEEK 11 | 2,017 | 5.3% | 822 | 475 |
| 2007/4/16 | WEEK 12 | 1,254 | 3.3% | 1,086 | 264 |
| 2007/4/23 | WEEK 13 | 3,450 | 9.0% | 1,889 | 803 |
| 2007/4/30 | WEEK 14 | 5,870 | 15.3% | 3,148 | 1,259 |
| 2007/5/7 | WEEK 15 | 7,842 | 20.4% | 4,604 | 1,456 |
| 2007/5/14 | WEEK 16 | 3,847 | 10.0% | 5,252 | 648 |
| 2007/5/21 | WEEK 17 | 1,254 | 3.3% | 4,703 | -549 |
| 2007/5/28 | WEEK 18 | 751 | 2.0% | 3,424 | -1,280 |
| 2007/6/4 | WEEK 19 | 747 | 1.9% | 1,650 | -1,774 |
| 2007/6/11 | WEEK 20 | 581 | 1.5% | 833 | -817 |
| 2007/6/18 | WEEK 21 | 121 | 0.3% | 550 | -283 |
| 2007/6/25 | WEEK 22 | 2,015 | 5.2% | 866 | 316 |
| 2007/7/2 | WEEK 23 | 2,471 | 6.4% | 1,297 | 431 |
| 2007/7/9 | WEEK 24 | 1,454 | 3.8% | 1,515 | 218 |
| 2007/7/16 | WEEK 25 | 924 | 2.4% | 1,716 | 201 |
| 2007/7/23 | WEEK 26 | 875 | 2.3% | 1,431 | -285 |
| 2007/7/30 | WEEK 27 | 524 | 1.4% | 944 | -487 |
| 2007/8/6 | WEEK 28 | 482 | 1.3% | 701 | -243 |

FIG.33

DISPLAY OF AUTOMATIC SEGMENTATION RESULTS

| SELECT | FIRST WEEK | RISING POINTS | DROPPING POINTS | RISING POINTS | DROPPING POINTS · FINAL WEEK |
|---|---|---|---|---|---|
| TIME FRAMES | WEEKS OF 2007/1/29 | WEEKS OF 2007/4/2 | WEEKS OF 2007/6/18 | WEEKS OF 2007/6/25 | WEEKS OF 2007/8/6 |
| | 1ST WEEK | 10TH WEEK | 21ST WEEK | 22ND WEEK | 28TH WEEK |

| | C1 | C2 | C3 | C4 |
|---|---|---|---|---|
| TIME FRAMES | WEEKS OF 2007/1/29 ~ WEEKS OF 2007/3/26 | WEEKS OF 2007/4/2 ~ WEEKS OF 2007/6/11 | WEEKS OF 2007/6/18 ~ WEEKS OF 2007/6/18 | WEEKS OF 2007/6/25 ~ WEEKS OF 2007/8/6 |
| | 1ST WEEK ~ 9TH WEEK | 10TH WEEK ~ 20TH WEEK | 21ST WEEK ~ 21ST WEEK | 22ND WEEK ~ 28TH WEEK |
| WEEKS | WEEK 9 | WEEK 11 | WEEK 1 | WEEK 7 |
| SEARCH NUMBER | 1,098 | 28,448 | 121 | 8,745 |
| CUMULATIVE SEARCH NUMBER | 1,098 | 29,546 | 29,667 | 38,412 |
| SEARCH RATIOS (SEARCHER BASE) | 2.9% | 74.1% | 0.3% | 22.8% |
| CUMULATIVE SEARCH RATIOS (SEARCHER BASE) | 2.9% | 76.9% | 77.2% | 100.0% |
| SEARCH RATIOS | 1.0% | 26.7% | 0.1% | 8.2% |
| CUMULATIVE SEARCH RATIOS | 1.0% | 27.7% | 27.8% | 36.0% |

FIG.34

DISPLAY OF AUTOMATIC SEGMENTATION RESULTS

| TIME FRAMES | | C1<br>WEEKS OF<br>2007/1/29 ~<br>WEEKS OF<br>2007/3/26 | C2<br>WEEKS OF<br>2007/4/2 ~<br>WEEKS OF<br>2007/6/11 | C3<br>WEEKS OF<br>2007/6/18 ~<br>WEEKS OF<br>2007/8/6 |
|---|---|---|---|---|
| | | 1ST WEEK ~ 9TH WEEK | 10TH WEEK ~ 20TH WEEK | 21ST WEEK ~ 28ST WEEK |
| WEEKS | | WEEK 9 | WEEK 11 | WEEK 8 |
| SEARCH NUMBER | | 1,098 | 28,448 | 8,866 |
| CUMULATIVE SEARCH NUMBER | | 1,098 | 29,546 | 38,412 |
| SEARCH RATIOS (SEARCHER BASE) | | 2.9% | 74.1% | 23.1% |
| CUMULATIVE SEARCH RATIOS (SEARCHER BASE) | | 2.9% | 76.9% | 100.0% |
| SEARCH RATIOS | | 1.0% | 26.7% | 8.3% |
| CUMULATIVE SEARCH RATIOS | | 1.0% | 27.7% | 36.0% |

FIG.38A

| USER IDS | ... | SEARCH TERMS | | | ... |
| --- | --- | --- | --- | --- | --- |
| | | SHAMPOO A | SHAMPOO B | SHAMPOO C | |
| 10001 | --- | 2008/8/5 | | | --- |
| 10002 | --- | 2008/6/1 | | | --- |
| 10003 | --- | 2008/7/16 | | | --- |
| 10004 | --- | 2008/9/1 | 2007/12/5 | 2008/3/5 | --- |
| 10005 | --- | 2008/6/24 | | | --- |
| 10006 | --- | | 2008/1/1 | | --- |
| 10007 | --- | | | 2008/2/4 | --- |
| 10011 | --- | 2008/5/1 | | | --- |
| 10013 | --- | 2008/5/2 | | | --- |
| 10024 | --- | 2008/5/2 | | | --- |
| 12303 | --- | 2008/5/2 | | | --- |

FIG.38B

| USER IDS | DATE & HOUR | SEARCH TERMS |
| --- | --- | --- |
| 100004 | 2007/12/5 | SHAMPOO B |
| 10007 | 2008/1/1 | SHAMPOO B |
| 10001 | 2008/2/4 | SHAMPOO C |
| 10004 | 2008/3/5 | SHAMPOO C |
| --- | --- | --- |
| 10011 | 2008/5/1 | SHAMPOO A |
| 12303 | 2008/5/2 | SHAMPOO A |
| 10013 | 2008/5/2 | SHAMPOO A |
| 10024 | 2008/5/2 | SHAMPOO A |
| 10002 | 2008/6/1 | SHAMPOO A |
| 10005 | 2008/6/24 | SHAMPOO A |
| 10003 | 2008/7/16 | SHAMPOO A |
| 10001 | 2008/8/5 | SHAMPOO A |
| 10004 | 2008/9/1 | SHAMPOO A |

| USER IDS | GENDER | AGE | ... | TEND TO PAY ATTENTION ON HAIR CARE | ANXIOUS ABOUT OVERLY DRY HAIR | TEND TO PAY ATTENTION ON DRESS-UP | SENSITIVE TO THE FASHION | ... | MEDIUM TO CONTACT WITH |||||
|---|---|---|---|---|---|---|---|---|---|---|---|---|---|
| | | | | | | | | | MAGAZINE A | MAGAZINE B | TV PROGRAM A | TV PROGRAM B | |
| 10001 | MALE | 23 | ... | 1 | 1 | 1 | 1 | ... | 0 | 1 | 1 | 1 | ... |
| 10002 | MALE | 51 | ... | 0 | 1 | 0 | 0 | ... | 1 | 0 | 0 | 1 | ... |
| 10003 | FEMALE | 34 | ... | 0 | 0 | 0 | 1 | ... | 0 | 0 | 1 | 0 | ... |
| 10004 | MALE | 21 | ... | 1 | 1 | 1 | 1 | ... | 0 | 1 | 1 | 0 | ... |
| 10005 | FEMALE | 24 | ... | 0 | 0 | 0 | 0 | ... | 0 | 0 | 0 | 1 | ... |
| 10006 | MALE | 39 | ... | 1 | 1 | 1 | 1 | ... | 0 | 1 | 1 | 1 | ... |
| 10007 | FEMALE | 42 | ... | 1 | 0 | 0 | 0 | ... | 0 | 0 | 0 | 1 | ... |

| ADVERTISEMENT FOR ACKNOWLEDGEMENT |||| PURCHASED ITEMS |||
|---|---|---|---|---|---|---|
| TV ADVERTISEMENT OF SHAMPOO A | MAGAZINE ADVERTISEMENT OF SHAMPOO A | BANNER ADVERTISEMENT OF SHAMPOO A | WEB-SITE FOR SHAMPOO A | SHAMPOO A | SHAMPOO B | SHAMPOO C |
| 1 | 0 | 1 | 1 | 0 | 0 | 1 |
| 1 | 1 | 0 | 1 | 0 | 0 | 0 |
| 1 | 0 | 0 | 0 | 1 | 0 | 0 |
| 0 | 0 | 1 | 1 | 0 | 0 | 0 |
| 1 | 1 | 0 | 1 | 0 | 1 | 0 |
| 1 | 0 | 0 | 0 | 1 | 1 | 0 |
| ... | ... | ... | ... | ... | ... | ... |

| DATE & HOUR | NUMBER OF RESPONDENT FOR SEARCH | USER IDS |
|---|---|---|
| 2008/5/1 | 1 | 10011 |
| 2008/5/2 | 3 | 12303,10013,10024··· |
| 2008/5/3 | ------ | ------ |
| | | |

FIG.45

TABULATION RESULT

TABULATION SEGMENTS: 5 SEGMENTS    TIME PERIOD OF TABULATION  2008/5/1~2008/9/22

| | C1 | C2 | C3 | C4 | C5 |
|---|---|---|---|---|---|
| TIME FRAMES | 2008/5/1 ~ 2008/6/1 | 2008/6/2 ~ 2008/6/30 | 2008/7/1 ~ 2008/7/18 | 2008/7/19 ~ 2008/7/30 | 2008/7/31 ~ 2008/9/22 |
| | DAY 1 ~ DAY 32 | DAY 33 ~ DAY 61 | DAY 62 ~ DAY 79 | DAY 80 ~ DAY 91 | DAY 92 ~ DAY 145 |
| DAYS | 32 | 29 | 18 | 12 | 54 |
| CUMULATIVE DAYS | 32 | 61 | 79 | 91 | 145 |
| NUMER OF SEARCH | 1,264 | 1,264 | 1,264 | 1,264 | 1,264 |
| CUMULATIVE SEARCH NUMBER | 1,264 | 2,528 | 3,792 | 5,056 | 6,320 |
| SEARCH RATIOS (SEARCHER BASE) | 20.0% | 20.0% | 20.0% | 20.0% | 20.0% |
| CUMULATIVE SEARCH RATIOS (SEARCHER BASE) | 20.0% | 40.0% | 60.0% | 80.0% | 100.0% |
| SEARCH RATIOS | 7.2% | 7.2% | 7.2% | 7.2% | 7.2% |
| CUMULATIVE SEARCH RATIOS | 7.2% | 14.4% | 21.6% | 28.8% | 36.0% |

FIG.46

| ITEMS | | C1 | C2 | C3 | C4 | C5 | NON-SEARCHERS | AVERAGE OF C1 TO C5 |
|---|---|---|---|---|---|---|---|---|
| GENDER | MALE | 8.9% | 10.2% | 9.2% | 7.4% | 5.2% | 58.4% | 8.2% |
| | FEMALE | 91.1% | 89.8% | 90.8% | 92.6% | 94.8% | 41.6% | 91.8% |
| AGE | TEENS | 31.4% | 27.4% | 24.9% | 19.5% | 21.2% | 17.5% | 24.9% |
| | 20'S | 38.4% | 39.2% | 42.5% | 44.2% | 28.9% | 18.7% | 38.6% |
| | 30'S | 11.2% | 12.4% | 13.3% | 18.9% | 29.2% | 19.1% | 17.0% |
| ‥‥‥ | ‥‥‥ | ‥‥‥ | ‥‥‥ | ‥‥‥ | ‥‥‥ | ‥‥‥ | ‥‥‥ | ‥‥‥ |
| TEND TO PAY ATTENTION OF HAIR CARE | | 64.5% | 59.8% | 51.2% | 53.6% | 50.9% | 28.6% | 56.0% |
| ANXIOUS ABOUT OVERLY DRY HAIR | | 76.5% | 41.2% | 38.6% | 40.2% | 30.2% | 18.2% | 45.3% |
| TEND TO PAY ATTENTION ON DRESS-UP | | 60.2% | 58.6% | 61.2% | 62.3% | 59.6% | 42.3% | 60.4% |
| SENSITIVE TO FASHION | | 85.2% | 75.6% | 72.3% | 69.2% | 65.4% | 32.5% | 73.5% |
| ‥‥‥ | ‥‥‥ | ‥‥‥ | ‥‥‥ | ‥‥‥ | ‥‥‥ | ‥‥‥ | ‥‥‥ | ‥‥‥ |
| MAGAZINE A | | 10.2% | 6.5% | 24.5% | 10.1% | 7.2% | 7.4% | 11.7% |
| MAGAZINE B | | 15.6% | 3.8% | 4.2% | 2.9% | 4.6% | 5.2% | 6.2% |
| ‥‥‥ | ‥‥‥ | ‥‥‥ | ‥‥‥ | ‥‥‥ | ‥‥‥ | ‥‥‥ | ‥‥‥ | ‥‥‥ |
| TV PROGRAM A | | 12.5% | 11.8% | 12.3% | 15.6% | 18.9% | 12.9% | 14.2% |
| TV PROGRAM B | | 17.2% | 14.2% | 12.6% | 10.9% | 8.6% | 7.8% | 12.7% |
| ‥‥‥ | ‥‥‥ | ‥‥‥ | ‥‥‥ | ‥‥‥ | ‥‥‥ | ‥‥‥ | ‥‥‥ | ‥‥‥ |

FIG.46b

| | | | | | | | | |
|---|---|---|---|---|---|---|---|---|
| TV ADVERTISEMENT OF SHAMPOO A | | 42.5% | 54.6% | 38.6% | 33.4% | 32.1% | 24.5% | 40.2% |
| MAGAZINE ADVERTISEMENT OF SHAMPOO A | | 21.8% | 16.5% | 10.2% | 9.5% | 8.2% | 5.6% | 13.2% |
| BANNER ADVERTISEMENT OF SHAMPOO A | | 18.9% | 15.6% | 2.1% | 1.8% | 3.1% | 1.7% | 8.3% |
| WEB-SITE FOR SHAMPOO A | | 10.5% | 10.6% | 10.7% | 2.1% | 1.9% | 1.2% | 7.2% |
| | | | | | | | | |
| SHAMPOO A | | 25.6% | 21.2% | 18.6% | 12.5% | 10.8% | 5.6% | 17.7% |
| SHAMPOO B | | 12.3% | 11.8% | 11.9% | 12.5% | 14.8% | 11.6% | 12.7% |
| SHAMPOO C | | 3.4% | 2.8% | 32.6% | 2.9% | 6.4% | 21.8% | 9.6% |
| SEARCH TIMING FOR SHAMPOO A | EXISTENCE OR NONEXISTENCE OF SEARCH | 100.0% | 100.0% | 100.0% | 100.0% | 100.0% | 0.0% | 100.0% |
| | AVERAGE DAYS | 12 | 18 | 39 | 64 | 84 | | 43 |
| SEARCH TIMING FOR SHAMPOO B | EXISTENCE OR NONEXISTENCE OF SEARCH | 10.2% | 5.1% | 2.9% | 2.6% | 2.3% | 2.2% | 4.2% |
| | AVERAGE DAYS | 29 | 51 | 49 | 53 | 64 | 78 | 49 |
| SEARCH TIMING FOR SHAMPOO C | EXISTENCE OR NONEXISTENCE OF SEARCH | 8.9% | 2.3% | 2.8% | 4.2% | 2.6% | 2.5% | 3.9% |
| | AVERAGE DAYS | 31 | 62 | 59 | 68 | 52 | 89 | 54 |

FIG.47

| ITEMS | C1 | C2 | C3 | C4 | C5 | NON-SEARCHERS | AVERAGE OF C1 TO C5 |
|---|---|---|---|---|---|---|---|
| ... | | | | | | | |
| TV ADVERTISEMENT OF SHAMPOO A | 42.5% | 54.6% | 38.6% | 33.4% | 32.1% | 24.5% | 40.2% |
| MAGAZINE ADVERTISEMENT OF SHAMPOO A | 21.8% | 16.5% | 10.2% | 9.5% | 8.2% | 5.6% | 13.2% |
| BANNER ADVERTISEMENT OF SHAMPOO A | 18.9% | 15.6% | 2.1% | 1.8% | 3.1% | 1.7% | 8.3% |
| WEB-SITE FOR SHAMPOO A | 10.5% | 10.6% | 10.7% | 2.1% | 1.9% | 1.2% | 7.2% |
| ... | | | | | | | |

FIG.48

| ITEMS | | C1 | C2 | C3 | C4 | C5 | NON-SEARCHERS | AVERAGE OF C1 TO C5 |
|---|---|---|---|---|---|---|---|---|
| GENDER | MALE | 8.9% | 10.2% | 9.2% | 7.4% | 5.2% | 58.4% | 8.2% |
| | FEMALE | 91.1% | 89.8% | 90.8% | 92.6% | 94.8% | 41.6% | 91.8% |
| AGE | TEENS | 31.4% | 27.4% | 24.9% | 19.5% | 21.2% | 17.5% | 24.9% |
| | 20'S | 38.4% | 39.2% | 42.5% | 44.2% | 28.9% | 18.7% | 38.6% |
| | 30'S | 11.2% | 12.4% | 13.3% | 18.9% | 29.2% | 19.1% | 17.0% |
| ... | | | | | | | | |
| TEND TO PAY ATTENTION OF HAIR CARE | | 64.5% | 59.8% | 51.2% | 53.6% | 50.9% | 28.6% | 56.0% |
| ANXIOUS ABOUT OVERLY DRY HAIR | | 76.5% | 41.2% | 38.6% | 40.2% | 30.2% | 18.2% | 45.3% |
| TEND TO PAY ATTENTION ON DRESS-UP | | 60.2% | 58.6% | 61.2% | 62.3% | 59.6% | 42.3% | 60.4% |
| SENSITIVE TO FASHION | | 85.2% | 75.6% | 72.3% | 69.2% | 65.4% | 32.5% | 73.5% |
| ... | | | | | | | | |
| MAGAZINE A | | 10.2% | 6.5% | 24.5% | 10.1% | 7.2% | 7.4% | 11.7% |
| MAGAZINE B | | 15.6% | 3.8% | 4.2% | 2.9% | 4.6% | 5.2% | 6.2% |
| ... | | | | | | | | |
| TV PROGRAM A | | 12.5% | 11.8% | 12.3% | 15.6% | 18.9% | 12.9% | 14.2% |
| TV PROGRAM B | | 17.2% | 14.2% | 12.6% | 10.9% | 8.6% | 7.8% | 12.7% |
| ... | | | | | | | | |

FIG.50A

| ITEMS | C1 |
|---|---|
| ANXIOUS ABOUT OVERLY DRY HAIR | 31.2% |
| SENSITIVE TO FASHION | 11.7% |
| BANNER ADVERTISEMENT OF SHAMPOO A | 10.6% |
| ... | ... |
| TV PROGRAM A | -1.7% |
| AGE 30'S | -5.8% |
| SHAMPOO C | -6.2% |
| ... | ... |

FIG.50B

| ITEMS | C2 |
|---|---|
| TV ADVERTISEMENT OF SHAMPOO A | 14.4% |
| BANNER ADVERTISEMENT OF SHAMPOO A | 7.3% |
| TEND TO PAY ATTENTION OF HAIR CARE | 3.8% |
| ... | ... |
| AGE 30'S | -4.6% |
| MAGAZINE A | -5.2% |
| SHAMPOO C | -6.8% |
| ... | ... |

FIG.51

| RANK | C1 | C2 | ... | C5 |
|---|---|---|---|---|
| 1 | ANXIOUS ABOUT OVERLY DRY HAIR | TV ADVERTISEMENT OF SHAMPOO A | ---- | AGE |
| 2 | SENSITIVE TO FASHION | BANNER ADVERTISEMENT OF SHAMPOO A | ---- | TV PROGRAM A |
| 3 | BANNER ADVERTISEMENT OF SHAMPOO A | TEND TO PAY ATTENTION OF HAIR CARE | ---- | GENDER |
| ---- | TV PROGRAM A | AGE | ---- | SENSITIVE TO FASHION |
| ---- | AGE | MAGAZINE A | ---- | AGE |
| ---- | SHAMPOO C | SHAMPOO C | ---- | ANXIOUS ABOUT OVERLY DRY HAIR |
| ---- | ---- | ---- | ---- | ---- |

ADVERTISING MEDIUM DETERMINATION DEVICE AND METHOD THEREFOR

TECHNICAL FIELD

The present invention relates to a device for determining advertising medium, specifically to a process for determining an advertising medium.

BACKGROUND ART

It is desired to run an advertisement in a sequence of an advertising media to be contacted with a cutting edge demographic, then that for a less cutting edge demographic and then that for a demographic of ordinary people from the viewpoint of advertisement effect because merchandises and services depends on the trends.

Under the circumstances, a method in which an advertisement plan is created by referring to a previously conducted questionnaire on attributions for the demographics such as "very sensitive to the fashion", "sensitive to the fashion" and "insensitive to the fashion" has been employed.

DISCLOSURE OF THE INVENTION

Problem to be Solved by the Invention

However, it is depending upon merchandise or services whether a respondent(s) of a questionnaire belonging to the cutting edge demographic. In addition, even when a respond(s) from the questionnaire is stored for each questionnaire responder, such evaluation is very subjective to each responder.

It is an object of the present invention to provide an advertising medium determination device capable of subjectively determining advertising medium and the timing of running such advertisement by utilizing search results using search engines on the Internet.

The characteristics, usage(s), advantage(s) of the present invention will be apparent from the embodiments herein and appended figures.

Means for Solving the Problem

1) The advertising medium determination device according to the invention comprising: 1) target specifying information storage means for storing correspondently with searchers' identification (ID) information for specifying target attribution including information for specifying information delivery medium of an object to contact with; 2) search term storage means for correspondently storing searchers' IDs, timing of search and search terms used for the search; 3) extraction means for extracting a timing of search for a search term for each searcher's ID from the search term storage means when the search term is provided as a search condition and segmenting the extracted search timing into a predetermined number in chronological order and extracting searcher's ID belonging to each segment; and 4) advertising medium data determination means for extracting candidates of information delivery medium for the each segment from the extracted each searcher's ID using information for specifying a target stored in the target specifying information storage means for determining one or more than two representation candidates of information delivery medium from the extracted candidates of information delivery medium, thereby determining the representation candidates of information delivery medium arranged in chronological order as advertising medium data in a name of advertising object provided correspondently to the search term. In this way, it is possible to determine chronological order of the advertising medium by segmenting each of the searchers for the search timing of search term in the past and by further referencing information delivery medium of an object to contact with by the searcher belonging to each of the segments.

2) The advertising medium determination device according to the invention, further comprising: search term specification means for specifying a search term corresponding to the name of advertising object and providing the specified search term to the extraction means while providing a term corresponding to the name of advertising object to the advertising medium data determination means when such term is provided thereto. In this way, when a term corresponding to the advertising medium is provided, a search term corresponding to the name of advertising object can be provided.

3) The advertising medium determination device according to the invention, wherein the search term stored in the search term storage means is classified into categories, and wherein the search term specification means specifies a search term of a category into which a term corresponding to the name of advertising object belong thereto. In this way, a search term in a category belonging to a term corresponding to the name of advertising object can be provided.

4) The advertising medium determination device according to the invention, further comprising: search number variation history calculation means for calculating variation history of search number representing chronological variation of the number of search for each search term stored in the search term storage means; and search number variation history storage means for storing variation history of the number of search; wherein the search term specification means displays variation history for each of the search terms and when one of the history is selected, its search term is specified. In this way, the operator can select a search term by referring to the search number variation history. The extraction is carried out using the search term.

5) The advertising medium determination device according to the invention, further comprising: search term specification means for providing a search term corresponding to the name of advertising object to the extraction means while providing the name of advertising object to the advertising medium data determination means when the name of advertising object and a search term corresponding thereto is provided. In this way, the extraction carried out using the provided search term.

6) The advertising medium determination device according to the invention, further comprising: segment determination means for storing a segment determination rule for segmenting into the predetermined number, wherein the extraction means extracts the searcher's ID using the segment determination rule provided from the segment determination means. In this way, a searcher of each segment is specified according to the segment determination rule.

7) The advertising medium determination device according to the invention, further comprising: 1) search number variation history calculation means for calculating variation history of search number representing chronological variation of the number of search for each search term stored in the search term storage means; 2) search number variation history storage means for storing variation history of the number of search; and 3) segment determination means for determining a segment in accordance with a shape of the variation history of search number; 4) wherein the extraction means extracts the searcher's ID using the segment provided from the segment determination means. In this way, a segment is determined in accordance with the shape of the variation history of search number.

8) The advertising medium determination device according to the invention, wherein the segment determination means determines a segment as a new segment when a variation ratio of the shape for the variation history of search number exceeds a predetermined ratio. In this way, a segment is automatically determined when a variation ratio for the variation history of search number exceeds a predetermined ratio.

9) The advertising medium determination device according to the invention, wherein the segment determination means displays the variation history of search number and determines a segment using the provided segment data. In this way, the operator can determine a segment by referring to the displayed variation history of search number.

10) The advertising medium determination device according to the invention, wherein the search term stored in the search term storage means is classified into categories, and the device further comprising: segment determination means for determining a segment under the segment of the search term of a category to which the search term belongs therein. In this way, a segment is determined by the search term belonging to the same category.

11) The advertising medium determination device according to the invention, further comprising: search number variation history calculation means for calculating variation history of search number representing chronological variation of the number of search for each search term stored in the search term storage means; and search number variation history storage means for storing variation history of the number of search; wherein when a name of advertising object is input as an object to be corrected the search term specification means specifies a search term that includes search number variation history similar to the search number variation history of the inputted name of advertising object and provides the specified search term to the advertising medium data determination means as the term corresponding to the name of advertising object. In this way, change can be made with the search term including search number variation history similar to the search number variation history of the inputted name of advertising object.

12) The advertising medium determination device according to the invention, further comprising: search number variation history calculation means for calculating variation history of search number representing chronological variation of the number of search for each search term stored in the search term storage means; and search number variation history storage means for storing variation history of the number of search; wherein when a name of advertising object is input as an object to be corrected the search term specification means specifies a search term that includes search number variation history similar to the search number variation history of the inputted name of advertising object, displays the search number variation history of the specified search term, and when any search term is selected, provides the selected search term to the advertising medium data determination means as the term corresponding to the name of advertising object. In this way, the change can be made with the selected search term out of search terms including similar search number variation history.

13) The advertising medium determination device according to the invention, wherein the search terms used as the search condition are a plurality of search terms combining one of logical AND and logical add or both of these, and wherein the extraction means calculates a time frame from the beginning of search to the end of the search for each search term and extracts searcher's ID belonging to each segment by carrying out calculation based on the search condition. In this way, it is possible to extract searcher's ID belonging to each segment by performing calculation based on the search condition of a plurality of search terms.

14) The advertising medium determination device according to the invention, wherein the calculation performed based on the search condition is a logical AND operation to be provided. In this way, it is possible to extract searcher's ID by performing calculation based on a logical AND operation.

15) The advertising medium determination device according to the invention, wherein a logical AND operation out of the calculations based on the search condition calculates the maximum value of a period. In this way, the value that fulfills the search condition can be obtained.

16) The advertising medium determination device according to the invention, wherein a logical AND operation out of the operations based on the search condition calculates the average value of a period. In this way, calculation that fulfills the search condition can be performed even when the search result against a partial condition greatly varies.

17) The advertising medium determination device according to the invention, wherein the extraction means carries out the calculation after normalization of the time frame about each of the obtained search terms on a search term to search term basis. In this way, calculation can be carried out with relative evaluation of periods for each of search terms.

18) The advertising medium determination device according to the invention, wherein the normalization is carried out through segmentation of the beginning of search to the end of the search for each search term in a predetermined number and through a logical AND operation depending on to which segment the segmented frame belonging to. In this way, no separate normalization processing is required.

19) The advertising medium determination device according to the invention, wherein when data out of the normalized data of each of the search terms that is subject to logical AND operation differs from other data equal or more than a predetermined threshold value, a logical AND operation is carried out with ignoring such normalized data. In this way, extraction can be carried out for searcher(s) who is even not subject to the extraction without varying search condition because a part of search condition differs from other data equal or more than a predetermined threshold value.

20) The advertising medium determination device according to the invention, wherein when no search timing exists in a search term that is subject to a logical AND operation, a logical AND operation is carried out with ignoring of such search term if the number of such search is equal or less than a predetermined number. In this way, extraction can be carried out for searcher(s) who is even not subject to the extraction without varying search condition because search result does not exist for a part of search condition.

21) The advertising medium determination device according to the invention, wherein when no search timing exists in a search term that is subject to a logical AND operation, a logical AND operation is carried out with ignoring of such search term if the number of such search is equal or less than a predetermined number. In this way, extraction can be carried out for searcher(s) who is even not subject to the extraction without varying search condition because search result does not exist for a part of search condition.

22) The method of determining advertising medium according to the present invention, the method comprising the step of: storing within a computer 1) information for specifying target attribution including information for specifying information delivery medium of an object to contact with correspondently with searchers' ID, and 2) data on a search term that corresponds a searcher's ID performing a search, a timing of the search, and the search term one another; wherein when a search term is provided, the computer extracts the timing of search for such search term from the search term storage means, segments the extracted search timing for each searcher's ID into a predetermined number in chronological order and extracts searcher's ID in each segment, and wherein the computer extracts a candidate of information delivery medium for the each segment from the extracted searcher's ID using the stored information for specifying target and determines one or more than two representative candidate of information delivery medium from the extracted candidate of information delivery medium, thereby the candidate of information delivery medium arranged in chronological order of the each segment is determined as advertising medium data in the name of advertising object provided correspondently to the search term.

In this way, it is possible to determine chronological order of the advertising medium by segmenting each of the searchers for the search timing of search term in the past and by further referencing information delivery medium of an object to contact with by the searcher belonging to each of the segments.

23) The advertising medium determination device according to the invention, comprising: 1) extraction means for extracting from search term storage means storing therein a searcher's ID, the timing of search, and the term used for the search the timing of search for such search term for each searcher's ID, segmenting the extracted search timing for each searcher's ID into a predetermined number in chronological order and extracting searcher's ID in each segment; and 2) advertising medium data determination means for extracting information on candidate of information delivery medium for the each segment from the extracted each searcher's ID using information for specifying target attribution including information for specifying information delivery medium of an object to contact that is stored correspondently with searchers' ID, determining one or more than two representative candidates of information delivery medium from the extracted candidates of information delivery medium, thereby determining the candidate of information delivery medium arranged in chronological order of the each segment as advertising medium data in the name of advertising object provided correspondently to the search term.

In this way, it is possible to determine chronological order of the advertising medium by segmenting each of the searchers for the search timing of search term in the past and by further referencing information delivery medium of an object to contact with by the searcher belonging to each of the segments.

24) The program for executing a computer the following steps according to the present invention, the program comprising the steps of: 1) extracting from search term storage means storing therein a searcher's ID, the timing of search, and the term used for the search the timing of search for such search term for each searcher's ID, segmenting the extracted search timing for each searcher's ID into a predetermined number in chronological order and extracting searcher's ID in each segment; and 2) extracting information on candidate of information delivery medium for the each segment from the extracted each searcher's ID using information for specifying target attribution including information for specifying information delivery medium of an object to contact that is stored correspondently with searchers' ID, determining one or more than two representative candidates of information delivery medium from the extracted candidates of information delivery medium, thereby determining the candidate of information delivery medium arranged in chronological order of the each segment as advertising medium data in the name of advertising object provided correspondently to the search term.

In this way, it is possible to determine chronological order of the advertising medium by segmenting each of the searchers for the search timing of search term in the past and by further referencing information delivery medium of an object to contact with by the searcher belonging to each of the segments.

25) The method of determining advertising medium with computers according to the present invention, the method comprising the step of: storing within a first computer 1) information for specifying target attribution including information for specifying information delivery medium of an object to contact with correspondently with searchers' ID, and 2) data on a search term that corresponds a searcher's ID performing a search, a timing of the search, and the search term one another; wherein when a search term is provided, the second computer extracts from the first computer the timing of search for such search term, segments the extracted search timing for each searcher's ID into a predetermined number in chronological order and extracts searcher's ID in each segment, and wherein the second computer extracts from the extracted searcher's ID candidates of information delivery medium for the each segment using the stored information for specifying target, determines one or more than two representative candidates of information delivery medium from the extracted candidates of information delivery medium, thereby the candidate(s) of information delivery medium arranged in chronological order of the each segment is determined as advertising medium data in the name of advertising object provided correspondently to the search term.

In this way, it is possible to determine chronological order of the advertising medium by segmenting each of the searchers for the search timing of search term in the past and by further referencing information delivery medium of an object to contact with by the searcher belonging to each of the segments.

The term "information for specifying target attribution" in this Specification refers to information for specifying attributions as target such as preference and belongings of each searcher. The information further includes information for specifying information delivery medium.

The term "information for specifying information delivery medium" refers to information for specifying information delivery medium to which a searcher contacting with, the name of magazines as advertising medium corresponding thereto in the embodiments, other than that, the name of newspaper(s), TV program(s), site(s) on the Internet may be included as well.

The term "extracts search timings of the search term(s) for each searcher's ID" refers to a process of extracting the earliest search timing for the searcher When plural searchers having the same search ID conduct plural searches. Here, the term "the earliest" refers to the oldest search timing when no starting timing of the search is specified, and the term means to the older search timing after the specified search timing when starting timing of the search is specified. For example, when three search timings such as 2008/1/10, 2008/2/16 and 2008/3/1 exist for a search term and for a searcher X, such 2008/2/16 is extracted as the earliest search timing when starting timing of the search of 2008/1/15 is specified, and 2008/1/10 is extracted as the earliest search timing when starting timing of the search of 2008/1/15 is not specified.

The term "data subject to logical AND operation differs from equal or more than a predetermined threshold value" includes the case in which no search results exist and that are missing values.

BRIEF DESCRIPTION OF DRAWINGS

FIG. 3 is a diagram showing data structure of a search terms storage part.

FIG. 4 is a diagram showing data structure of a target data storage part.

FIG. 5 is a diagram showing an example of variation history data of search number.

FIG. 6 is a diagram showing data structure of a created plan.

FIG. 7 is a diagram showing details of a created plan.

FIG. 12 is a diagram showing data structure of variation history data of search number for each segment.

FIG. 14 is a display example of advertising medium, which become candidates thereof.

FIG. 15 is a display example of advertising medium, which become candidates thereof.

FIG. 17 is a display example of a determined advertising medium.

FIG. 20 is a data example of variation history data of search number.

FIG. 22 is a diagram showing data structure of definition files.

FIG. 25 is an example of a dialog box for determining search term for correcting plan(s).

FIG. 27 is a display example of pre- and post-correction of plans.

FIG. 28 is a display example of pre- and post-correction of plans.

FIG. 31 is an example of a dialog box for determining parameters for segments of variation history of search number.

FIG. 32 is a diagram showing examples of calculation results of moving average values, total cumulative distribution numbers.

FIG. 33 is a display example at automatic segment processing.

FIG. 34 is another display example at automatic segment processing.

FIGS. 38A and 38B are diagrams showing data structure of a search term storage part.

FIG. 39 is a diagram showing data structure of a questionnaire results data storage part.

FIG. 40 is a diagram illustrating an example of variation history of search number.

FIG. 45 is a diagram illustrating data structure of variation history of search number for each segment.

FIGS. 46 and 46b are examples of cross tabulation results.

FIG. 47 is an example of cross tabulation results a part of which is highlighted.

FIG. 48 is an example of highlighted cross tabulation result.

FIGS. 50A and 50B are examples of results in the order of significant items.

FIG. 51 is an example of results in the order of significant item.

DESCRIPTION OF REFERENCE NUMERALS

1: Advertising medium determination device
23: CPU
27: Memory

EMBODIMENTS FOR CARRYING OUT THE INVENTION

1. Outline of the Overall Structure

Figure 1:
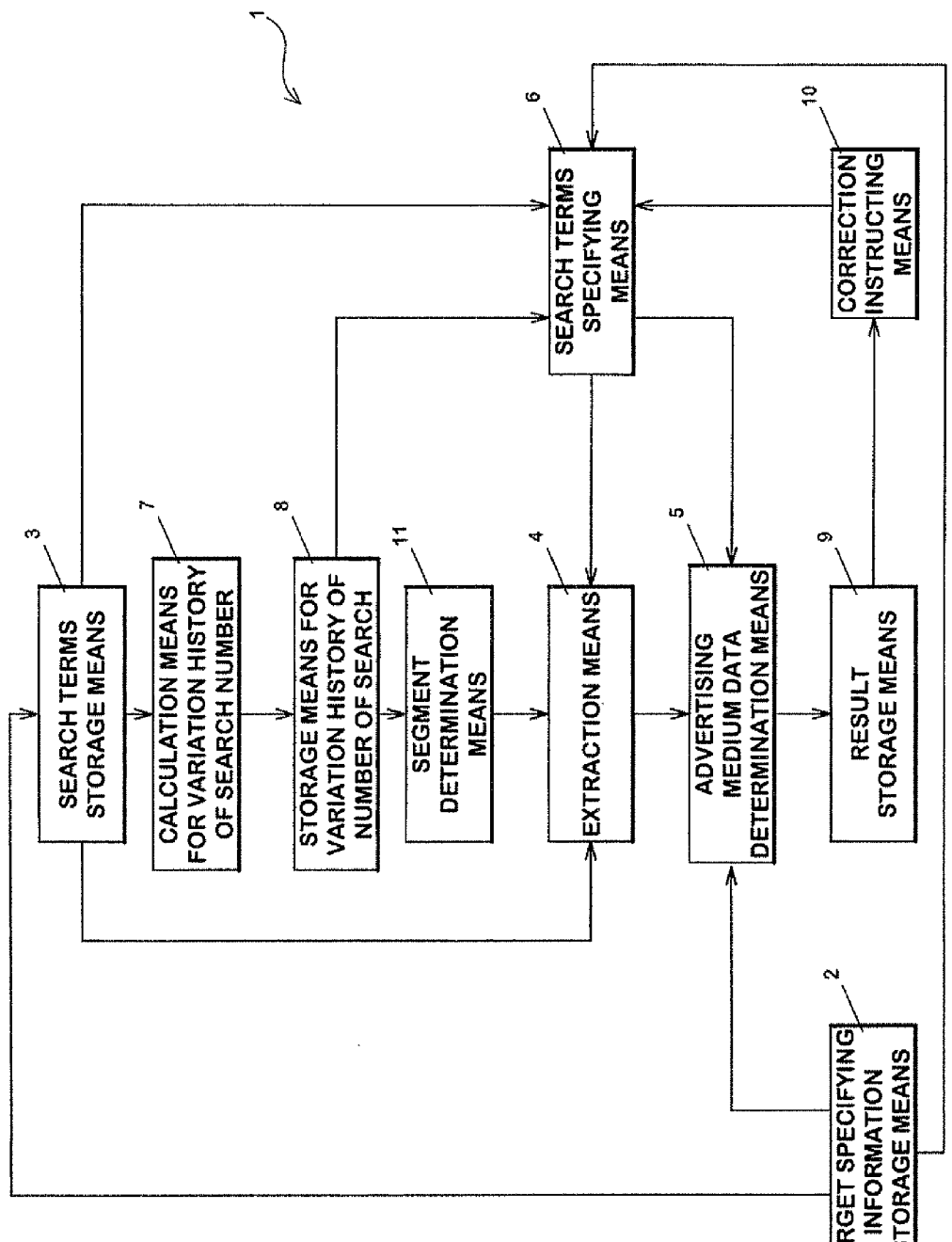
FIG. 1a is a functional block diagram of an advertising medium determination device 200 according to an embodiment of the present invention.
Figure 1A:
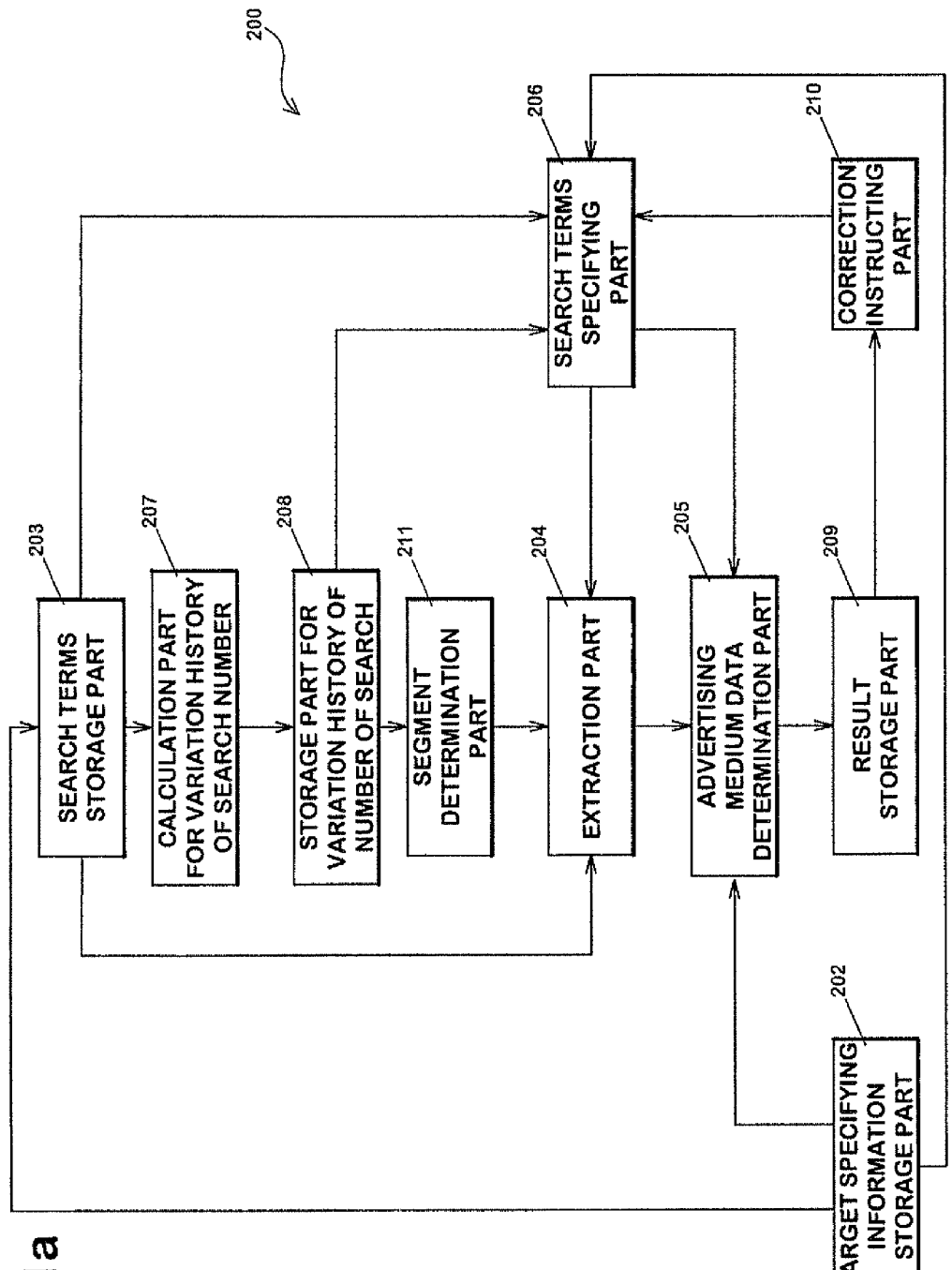

FIG. 1 shows a functional block diagram of an advertising medium determination device 1 according to the present invention. The advertising medium determination device 1 comprises target specifying information storage means 2, search term storage means 3, extraction means 4, advertising medium data determination means 5, search terms specifying means 6, search number variation history calculation means 7 and search number variation history storage means 8.

The target specifying information storage means 2 stores information for specifying target attribution including information for specifying information delivery medium of an object to contact with correspondently with searchers' ID. The search term storage means 3 correspondently stores a searcher's ID, the timing of search, and the term used for the search. When a search term is provided as a search condition, the extraction means 4 extracts the timing of search for such search term for each searcher's ID from the search term storage means, segments the extracted search timing for each searcher's ID into a predetermined number in chronological order and then extracts searcher's ID belonging to each segment.

The advertising medium data determination means 5 extracts information on candidate of information delivery medium for the each segment from the extracted each searcher's ID using information for specifying a target stored in the target specifying information storage means 2, determines one or more than two candidate(s) of information delivery medium from the extracted candidate of information delivery medium, thereby the candidate(s) of information delivery medium arranged in chronological order of the each segment is determined as advertising medium data in the name of advertising object provided correspondently to the search term. The determined advertising medium data is stored in result storage means 9.

In response to providing the name of advertising object and a search term corresponding thereto, the search terms specifying means 6 provides to the extraction means 4 a search term corresponding to the name of advertising object while providing the name of advertisement object the advertising medium data determination means 5.

The search number variation history calculation means 7 calculates variation history of search number representing chronological variation of the number of search(es) (the term "the number of search" is hereinafter referred to as "search number" or equivalent term) for each search term stored in the search term storage means 3. The search number variation history storage means 8 stores the calculated variation history of search number. In addition, when a name of advertising object is input as an object to be corrected, the search terms specifying means 6 specifies a search term including variation history of search number similar to the variation history of search number of the name of advertising object being inputted, displays the variation history of search number to be specified and any term is selected, the selected term is provided to the advertising medium data determination means 5 as a term corresponding to the name of advertising object.

The extraction means 4 calculates a time frame from the beginning of search to the end of the search for each search term when a plurality of search terms, combining one of logical AND and logical add or both of them, are provided as a search condition, and extracts searcher's ID for each segment by carrying out calculation based on the search condition.

Further, segment determination means 11 determines segments in accordance with the shape of the variation history of search number. The extraction means 4 extracts the searcher's ID using the segments provided from the segment determination means 11.

Although, an example of storing the target specifying information storage means 2 and the search term storage means 3 within one advertising medium determination device 1, both may be stored in a separate computer and can also be read therefrom.

2. Hardware Structure

Figure 2:
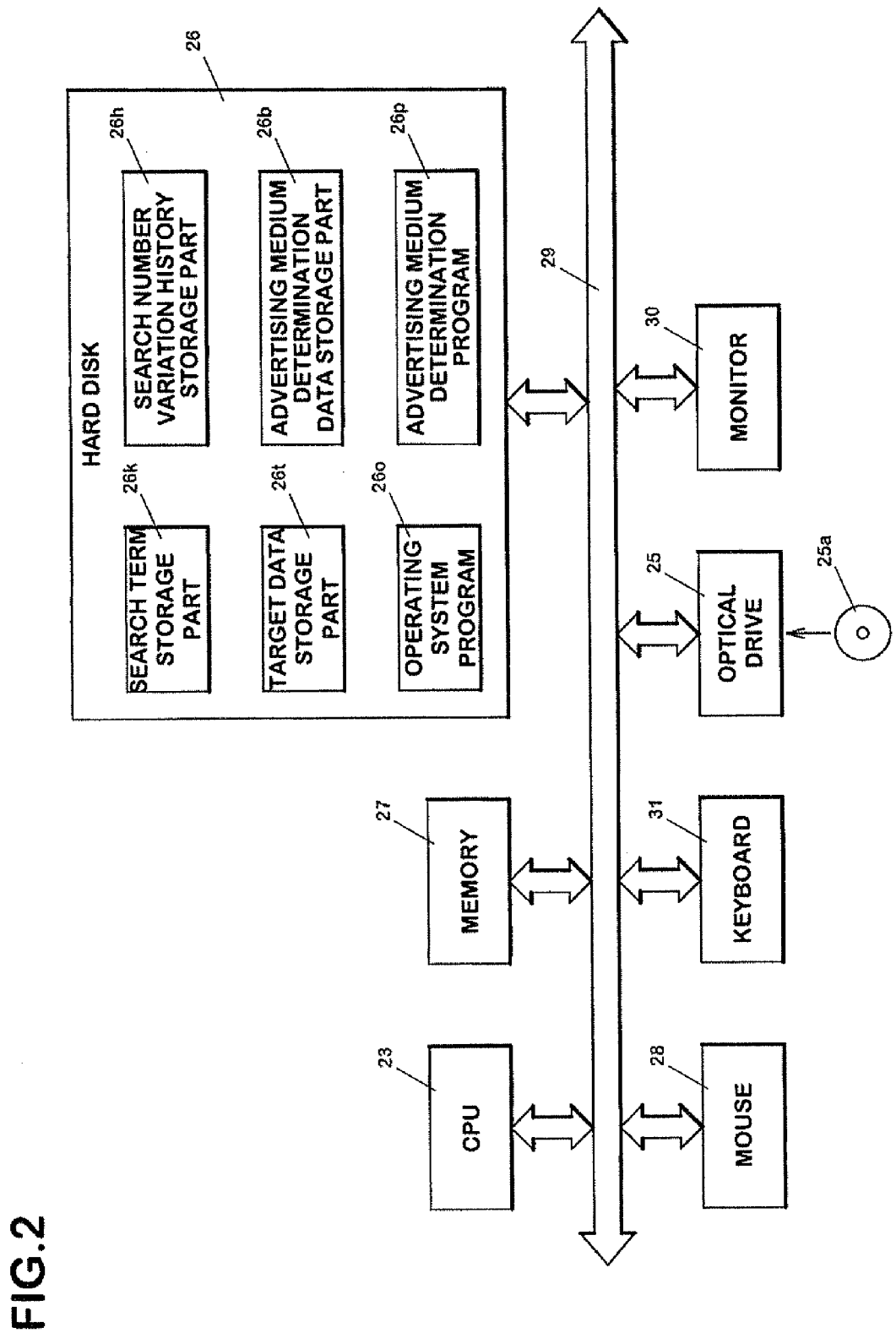
FIG. 2 is an example of hardware structure of the advertising medium determination device 1.

Hardware structure of the advertising medium determination device 1 will be described. FIG. 2 is an example of hardware structure of the advertising medium determination device 1 using a CPU.

The advertising medium determination device 1 comprises a CPU 23, a memory 27, a hard disk 26, a monitor 30, an optical drive 25, a mouse 28, a keyboard 31 and a bus line 29. The CPU 23 controls each of the parts according to each of programs stored in the hard disk 26 through the bus line 29.

The hard disk 26 comprises an operating system program 26o (hereinafter referred to as OS for short), an advertising medium determination program 26p, a search term storage part 26k, a target data storage part 26t, a search number variation history storage part 26h and an advertising medium determination data storage part 26b.

In the search term storage part 26k, user IDs and the search timings are stored as searchers' IDs who conduct searches for each search term as shown in FIG. 3. In this embodiment, date of search and their time are stored as the search timings, instead of that date of search alone may be stored. Such search tunings and users' IDs for each search term may store the search term and its search timing for the searches using search engines on the Internet for each user targeting the users who login a portal site for example.

As shown in FIG. 4, target attribution specifying information containing advertising medium specifying information for specifying advertising medium to which user him/her-self contact is stored in the target data storage part 26t for each user. For example, a user having a user ID10001 has contacting medium such as magazine B, TV programs A, B as advertising medium and target attribution of the user such as "tend to pay attention on dress-up", "sensitive to the fashion" is stored therein. Further, products that is having by the user (for example, "computer A", "drink A") are stored therein. As to information on products, data such as purchasing history, purchasing plan and purchasing quantity and so on may be handled. Such target attribution for each user may be acquired one of at the new registration of the user or through a questionnaire and the like thereafter.

As will be described later, "date and hour", "number of search respondent", "respondents' IDs" for each search term are stored in the search number variation history storage part 26h as variation history of search number representing chronological variation of search number by tabulating each of search terms stored in the search term storage part 26k. For example, for a search term shown in FIG. 5, one search is conducted on 2007/4/2 by one searcher having ID of "10011". In addition, three searches are conducted on 2007/4/5 by three searchers having ID of "120303", "10013" and "10024". Thus, variation history of search number in chronological order is recorded in the search number variation history storage part 26h.

As shown in FIG. 6, advertising medium determination data generated by the advertising medium determination program 26p that will be described later is stored in the advertising medium determination data storage part 26b. FIG. 7 shows tangible data structure of each advertising medium determination data. As illustrated in the drawing, within the advertising medium determination data, an advertising media is assigned to each of advertising periods.

Figure 8:
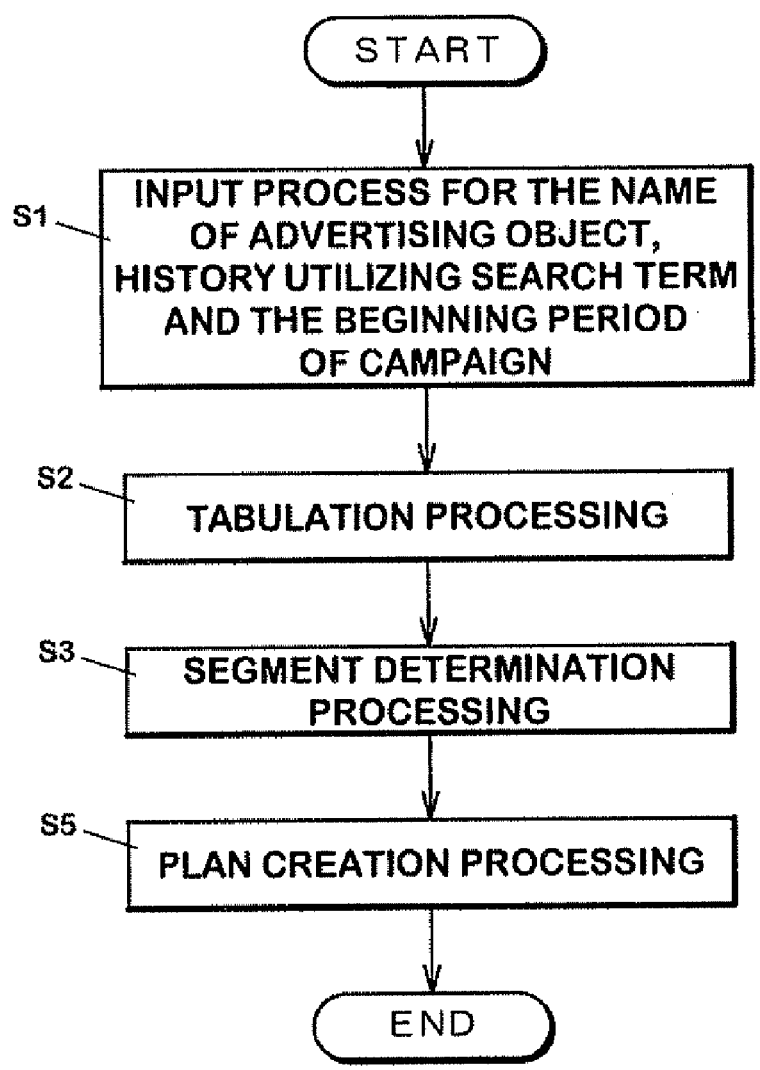
FIG. 8 is a flowchart of a process for determining advertising medium.

The advertising medium determination program 26p generates advertising medium determination data illustrated in FIGS. 6 and 7 by carrying out tabulation processing (step S2), segment determination processing (step S3) and plan creation processing (step S5) shown in FIG. 8. The details of these processing will be described later.

In this embodiment, Windows Vista (a registered trademark or a trademark) is employed as an operating system program (OS) 26o, any other OS may also be used as well.

Each of the programs is read out from a CD-ROM 25a storing programs via the optical drive 25, and such program is installed into the hard disk 26. Alternatively, each of the programs can read out from a computer readable medium other than CD-ROM, such as flexible disks (FD), IC cards and so on and is installed into the hard disk. In addition, such program may also download through a communication line.

In this embodiment, the computer indirectly performs programs stored in the CD-ROM by installing the programs from the CD-ROM into the hard disk 26. However, it is possible to perform the programs stored in the CD-ROM directly from the optical drive 25 without any limitation of the above-described way. Computer implementable programs include not only programs capable of being directly performed by just installing them, but they also include the programs need to be converted into other formats and the like (for example, that need to be decompressed from data compression format and the like), in addition to program(s) that can be performed in combination with other module parts.

3. Advertising Medium Determination Processing

Figure 9A:
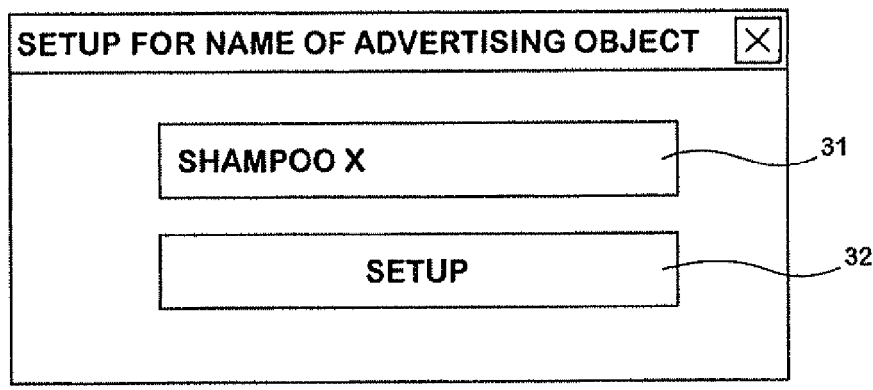
FIGS. 9A, 9B, and 9C are diagrams showing a dialog box to be displayed.
Figure 9B:
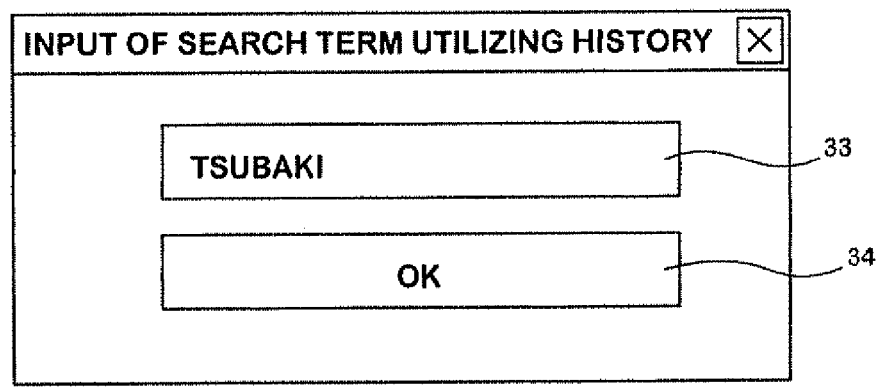
Figure 9C:
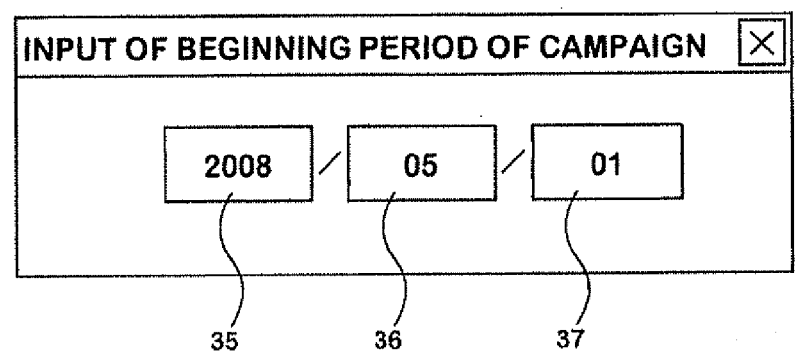

In what follows, advertising medium determination processing will be described with reference to FIG. 8. the cpu 23 carries out input processing for the name of advertising object, history utilizing search term and the beginning period of campaign (step s1). such processing may be carried out by displaying a dialog box shown in FIG. 9 and prompting the input therein. in FIG. 9*a*, the name of advertising object is set-up by inputting the name in a region 31 and clicking a button 32. in FIG. 9*b*, the name of advertising object is set-up by inputting a search term in a region 33 and clicking a button 34. in FIG. 9*c*, the beginning period of campaign may be input in regions 35 to 37. in the below example, it is assumed that "shampoo x", "tsubaki" and "may 1, 2008" are respectively input therein as a name of advertising object, a search term utilizing history and a beginning period of campaign.

1) [Tabulation Processing]

Figure 10:
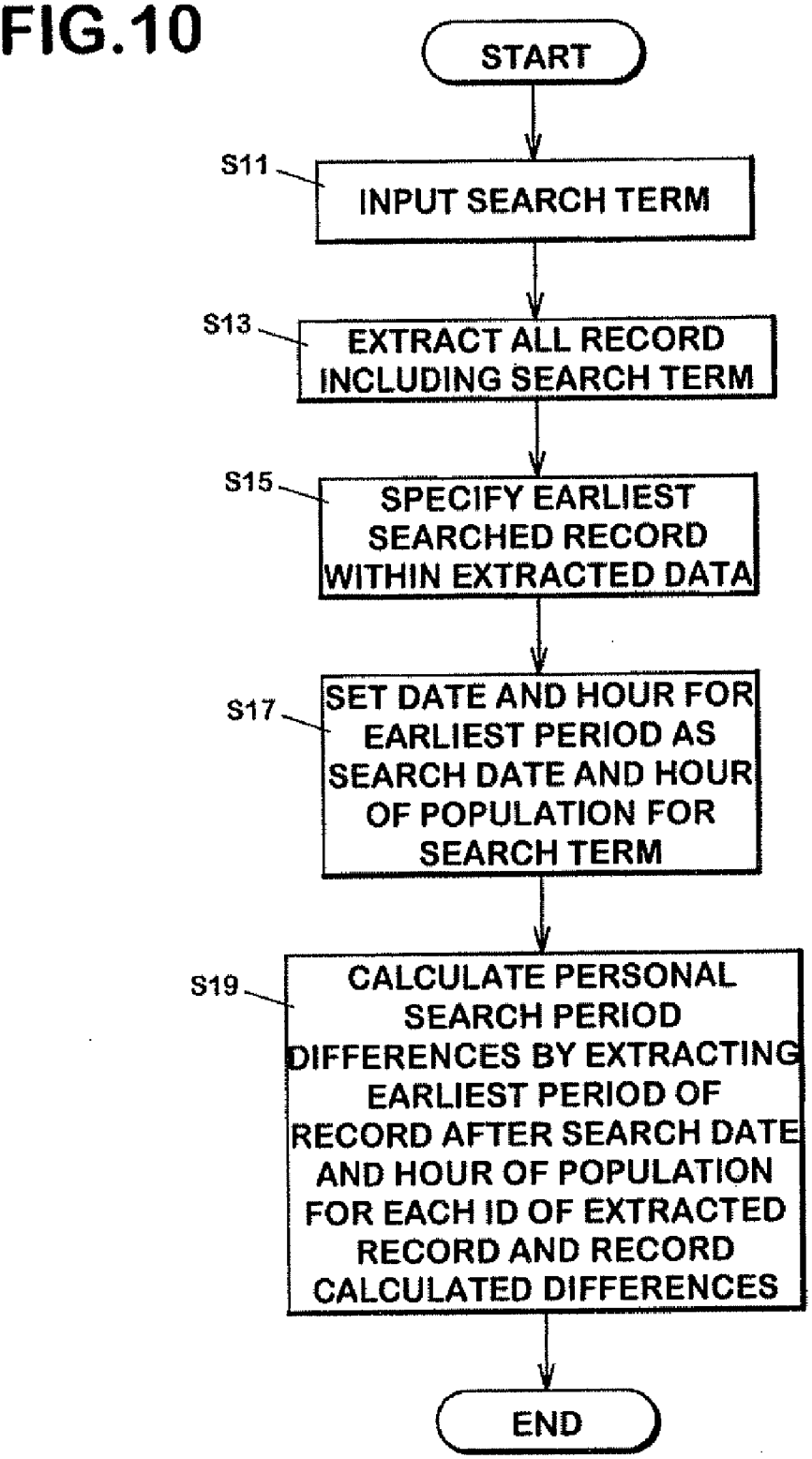
FIG. 10 is a flowchart of tabulation processing.

The CPU 23 carries out tabulation processing (FIG. 8, step S1). The detail of tabulation processing is shown in FIG. 10.

The CPU 23 judges whether a search term utilizing history (hereinafter referred to as search term) is input (FIG. 10 step S11), all the record of search for the search term is extracted when the search term in input (step S13). In this case, the CPU 23 extracts a searcher ID "10011", search date and hour "06:01 on 2007/4/2", a search term "TSUBAKI", a searcher ID "12303", search date and hour "16:22 on 2007/4/5", a search term "TSUBAKI", a searcher ID "10013", search date and hour "16:24 on 2007/4/5", a search term "TSUBAKI", a searcher ID "10024", search date and hour "19:10 on 2007/4/5", a search term "TSUBAKI" and so on because the search term for this case is "TSUBAKI".

The CPU 23 specifies the earliest searched record within the extracted records (step S15). Then the CPU 23 sets the date and hour for the earliest search timing as a search date and hour of population for the search term (step S17). For example, in the case shown in FIG. 3, the search date and hour of population for the search term "TSUBAKI" becomes 06:01 on 2007/4/2.

Depending on the search term being input at step S11, the search date and hour of population therefor could be far in advance. In that case, it is possible for an operator to input arbitrary date and hour by displaying the search date and hour of population calculated at step S7 on the monitor and ask for him/her to confirmation "search date and hour of population is a certain yy/mm/dd, is it OK?".

The CPU 23 calculates individual search timing difference by extracting the earliest period of record after the search date and hour of population for each ID of the extracted record and records the calculated differences (FIG. 10 step S19). In this embodiment, days are used as individual search timing differences. However, in the case of FIG. 3, the search date and hour 2007/4/2, respondent number "1", searcher's ID "10011", the search date and hour 2007/4/5, respondent number "3", searchers' IDs "12303", "10013" and "10024" and so on shown in FIG. 5 can be obtained as the number of respondents of searches per day and respondents' IDs. The unit for tabulation may be input arbitrarily such as a week, a month or morning, afternoon, a certain period (for example three hours).

When plural searches for the same search term(s) are conducted, the earliest date thereof is the earliest search date and time for the user and the difference between the earliest search date and time and the search date and hour of population becomes an individual search timing difference for the user.

2) [Segment Determination Processing]

Upon completion of the tabulation processing, the cpu 23 carries out segment determination processing (FIG. 8 step s3). in this embodiment, the steps of displaying variation history of search number for the search term by which the above variation history data of search number is generated, chronologically segmenting such data into a predetermined number using the search timing as a key with reference to the variation history by the operator, segmenting from the beginning of the search to the end thereof for the search term into a predetermined number, and extracting user ids that belong to each of the segments. such processing will be described herein.

Figure 11:
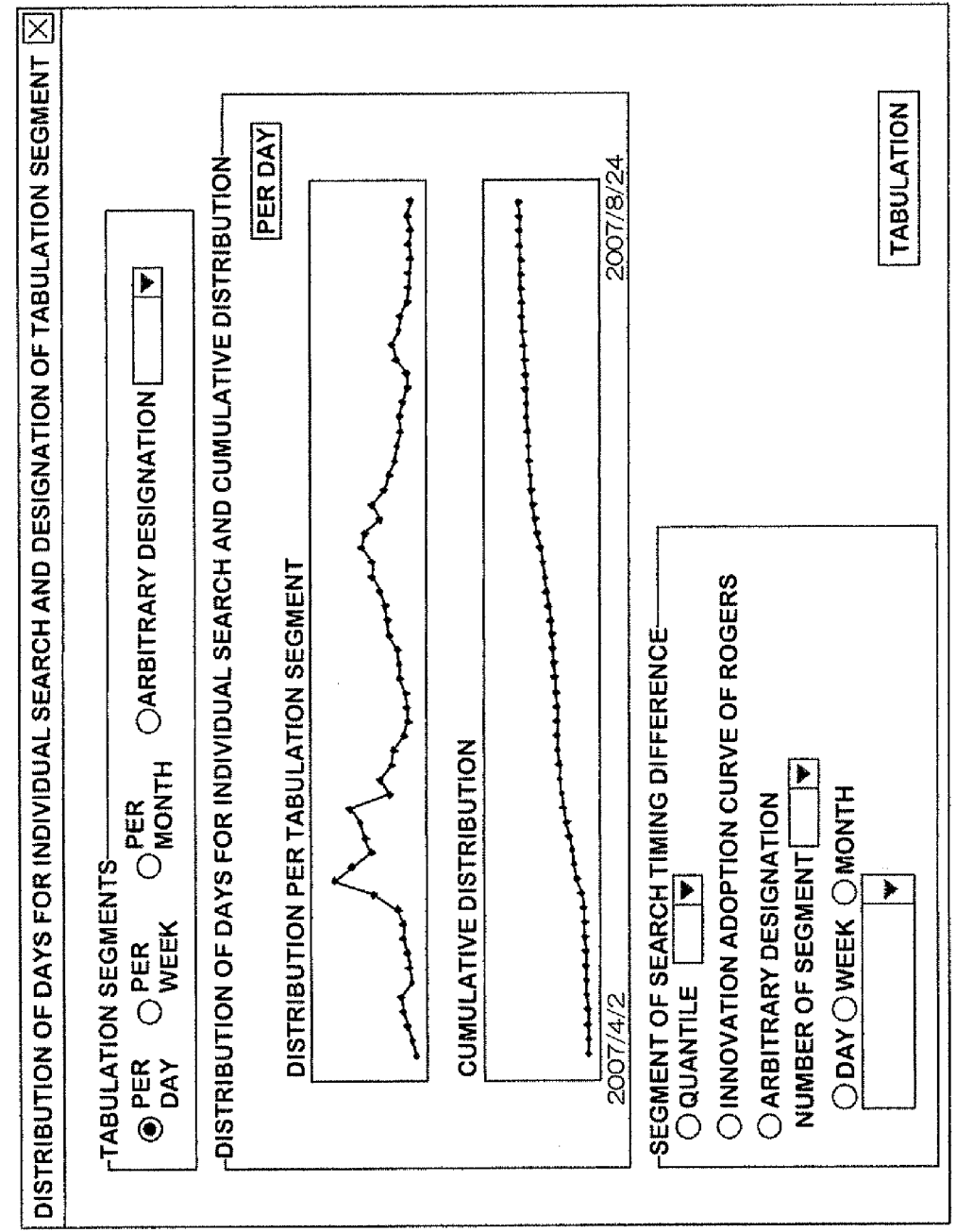
FIG. 11 is a display example of variation history data of search number.

The CPU 23 displays line charts in accordance with the above variation history data of search number. In this embodiment, such line charts takes the abscissa axis and the ordinate axis respectively as dates (individual search timing differences) and the number of searches. Consequently, a tabulation segment distribution shown in FIG. 11 is displayed. The operator designates a method of segmentation and the number of segments with reference to such distribution. In this way, the number of segments is determined. In description below, it is assumed that the number of segments five is designated under the segmentation based on quantile. The segmentation based on quantile is a segmentation in which total search number is equally segmented into a predetermined segment number. In this case, the total number is segmented into five by dividing until each of the total reaching to 20% of the total because the number of segment is five. An example of post-segmentation data is shown in FIG. 12.

For the method of segmentation, various methods such as The innovation adoption curve of Rogers and so on other than the quantile may also be employed. In addition, segmentation in calendar such as monthly and time segment starting at search date and hour of population and so on may be used.

3) [Plan Creation Processing]

Subsequently the CPU 23 carries out plan creation processing (FIG. 8 step S5). in the plan creation processing, a user belonging to the segment obtained by step S3 is specified, and candidate of information delivery medium for the each segment is extracted using information for specifying target. further, one or more than two representative candidates of information delivery medium are determined from the extracted candidate of information delivery medium, thereby the representative candidates of information delivery medium arranged in chronological order of the each segment are determined as advertising medium data in provided in response to the search term.

Figure 13:
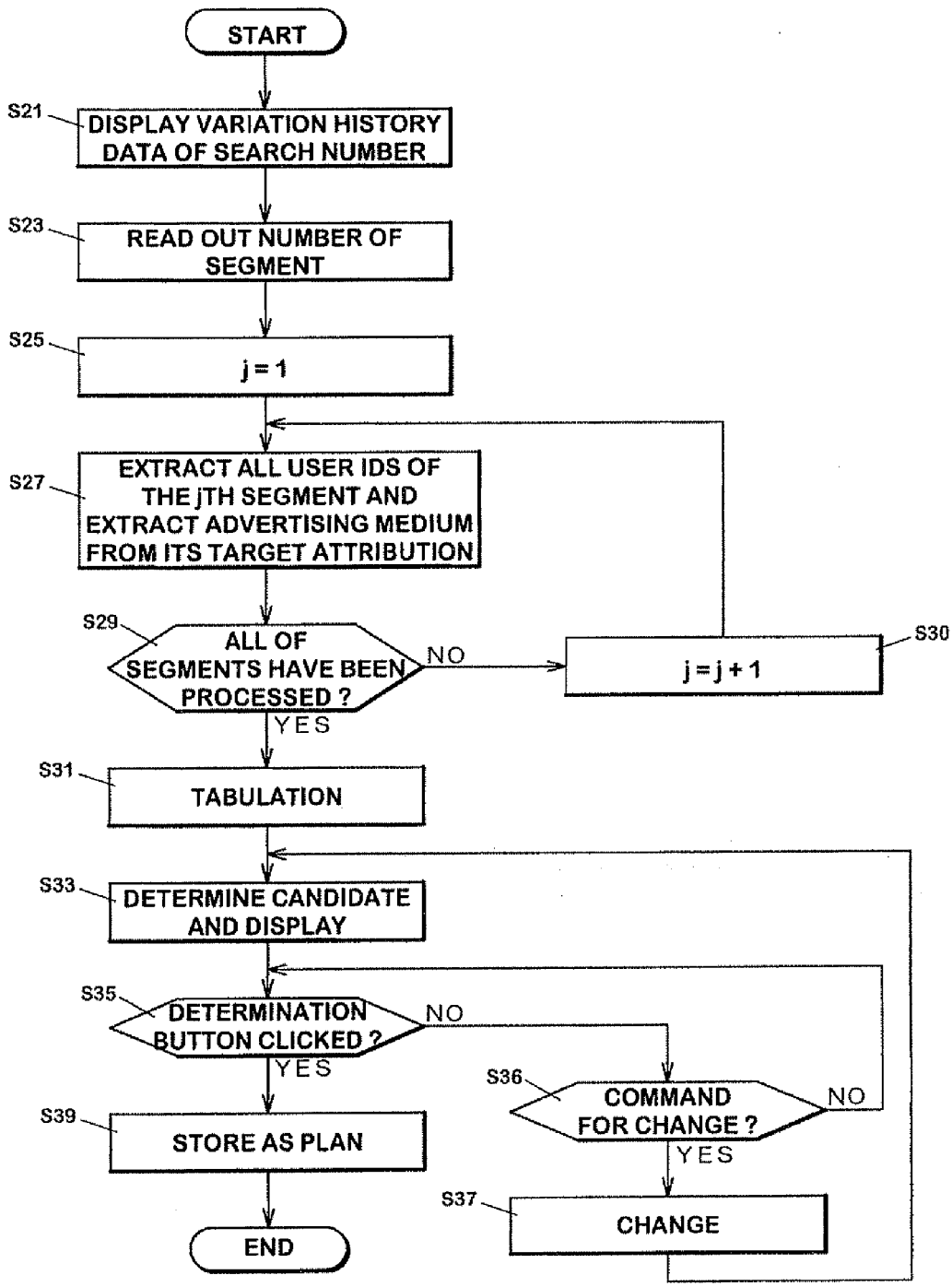
FIG. 13 is a flowchart of plan creation processing.

In description below, plan creation processing will be described with reference to FIG. 13. The CPU 23 displays variation history data of search number (step S21). Then the CPU 23 reads out the number of segment "5" (FIG. 13 step S23). The CPU 23 initializes segment to be processed j (step S25), extracts all the user IDs belonging to the jth segment and extracts the advertising media from its target attribution and calculates a ratio thereof within the segment (step S27). In this case, because of j=1, all the user IDs that belong to the first segment C1 is read out from the variation history data of search number shown in FIG. 5, all the advertising media to which each user frequently contacts are read out, the number of the advertising media is counted and the contact frequency ratio to the medium in the segment may be calculated. For example, if the numbers of users belong to segment C1 are 1000 and a record is made that the numbers of these users who frequently contact to magazine A are 123, the contact frequency ratio to the magazine A is 12.3%. In this way, the contact frequency ratio within the segment is calculated for the entire advertising medium.

The CPU 23 judges whether or not all of the segments have been processed (step S29), in this case, it increments the segment to be processed j because not all of the segments have been processed (step S30) and repeats steps subsequent to step S27.

Upon completion of processing for all the segments, the results are tabulated (step S31). Further, the CPU 23 determines advertising medium that become candidate(s) of advertisement medium and displays them (step S33). A display example thereof is shown in FIG. 14.

In this embodiment, the advertising medium is listed in the order of ones having the higher contact frequency ratio within the segment, and within the listed mediums, the mediums having their contact frequency ratio higher than a predetermined value in the segment are specified as candidates and highlight them for particular display. However, the ones having the highest contact frequency ratio may be determined as candidates without restriction of the above way. Further, the particular display may be a display in other color(s) and a display at some other place from other media, a display with different character size(s) and other display variations. Such particular display is an arbitrary designation.

If the user want to change the display upon taking a look at the displayed candidates, he/she may just select a selection region of the advertising medium with a pointing device. For example, in FIG. 14, the medium having more than 3% higher contact frequency ratio are shown in a particular display as candidates. No highlight display is made on the magazines K and M because these magazines do not have more than 3% higher contact frequency ratio than the total average contact frequency within a segment C4. Similar fact is applied to the magazines K and M within a segment C5. Regions 53, 54, 55 and 56 may be clicked when the operator selects these advertising media.

The CPU 23 judges existence of a command for change (step S36) and changes the display when it judges that such command exists (step S37). FIG. 15 shows a display state after the display of candidates has changed while the regions 53, 54, 55 and 56 are in clicked state.

By varying the values in the region 61, threshold values displayed in highlight display by default can be changed.

Figure 16:
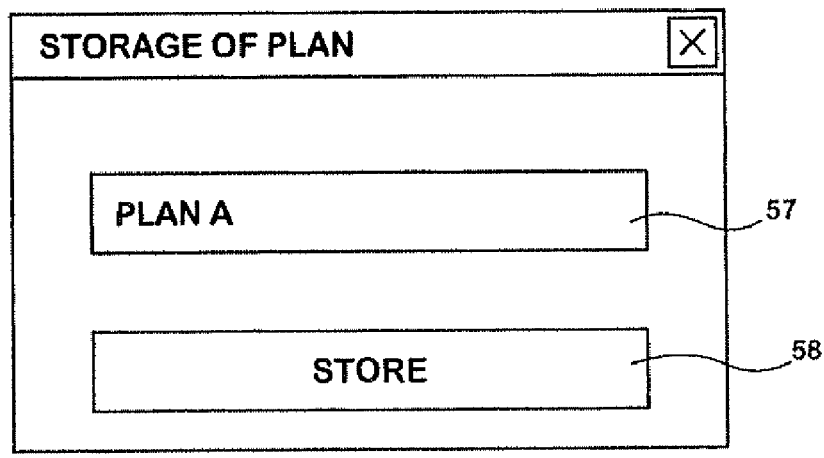
FIG. 16 is an example of a dialog box to be displayed.

The operator selects a button 51 illustrated in FIG. 15 when it is satisfactory. The CPU 23 judges whether the button 51 is clicked after step 537 (FIG. 13 step S35) and stores the plan as a determined plan when the button 51 is clicked. The name of a plan may be input through the steps of displaying an image shown in FIG. 16 for prompting input of the plan into a region 57 and clicking a button 58.

FIG. 17 shows outline of the determined plan A.

In this embodiment, an example of selecting magazines as advertising media, other advertising medium such as news papers, televisions, the Internet and so on can also be selected.

In this embodiment, suggestions for advertising medium plan are created by carrying out the steps of adequately segmenting search timing for a search term(s) using the search results at search engines on the Internet, determining respondents that belong to the segment and extracting the advertising medium to which the respondent(s) frequently contacting with. In this way, suggestions for advertising medium plan corresponding to a past search tendency can be created. It is considered that the degree of interest for a particular search term(s) has a certain relation to the interest to new products. Suggestions for advertising medium plan that is free from user's subjective can be created because search timings for particular search term(s) have relevance with the sensitivity to trends. In this embodiment, actual number of days for conducting search is used as the days for each segment, but it is not limited to that way.

4. Correction Processing

A "plan A" of "shampoo X" thus created is a suggestion of plan that is created on the absolute assumption that the product gets attention similar to a search term previously searched. A new search is conducted for the name of this advertising object "shampoo X" as a new search term. Consequently, there might be a possibility that the search result thereof is entirely different from that of the search term "TSUBAKI". In this embodiment, a created suggestion of plan is corrected correspondently with actual search history in addition to use search history of another search term. In this way, a suggestion for advertising medium plan corresponding to the actual search history for the name of advertising object may be created.

In the below description, the case where a correction being made on 6/19 about a "plan A" for "shampoo X" that is created under the name of advertising object using "TSUBAKI" with another search term, will be described.

Figure 19:
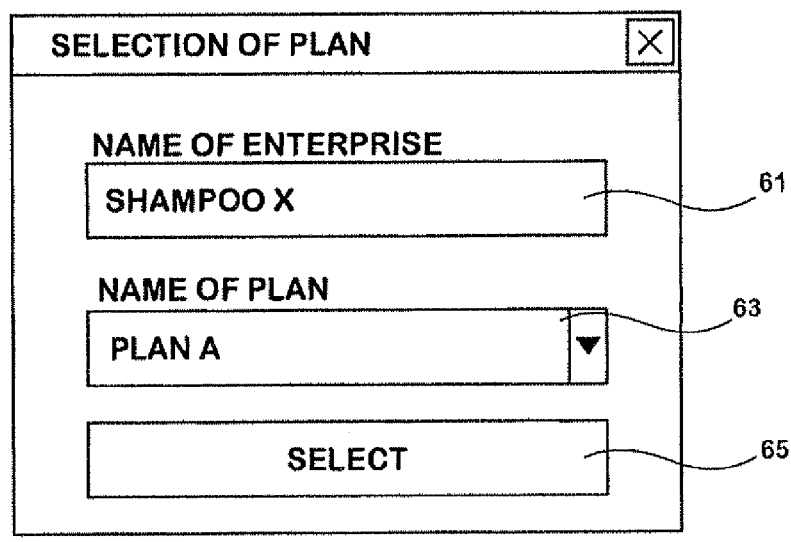
FIG. 19 is an example of a dialog box to be displayed.

The CPU 23 carries out input processing of a correction object (step S41). To do that, prompt the input by displaying a dialog box shown in FIG. 19. The operator inputs "shampoo X" in a region 61. The CPU 23 displays the plan on shampoo X on a region 63. In this case, the plan A is displayed on the region 63 since the "plan A" exists.

The operator clicks a determination button 65 when the correction object is plan A. By doing that, the input processing is completed. Plural plans are displayed on the region 63 because there might a case where plural plans are stored for one advertising object name.

Figure 18:
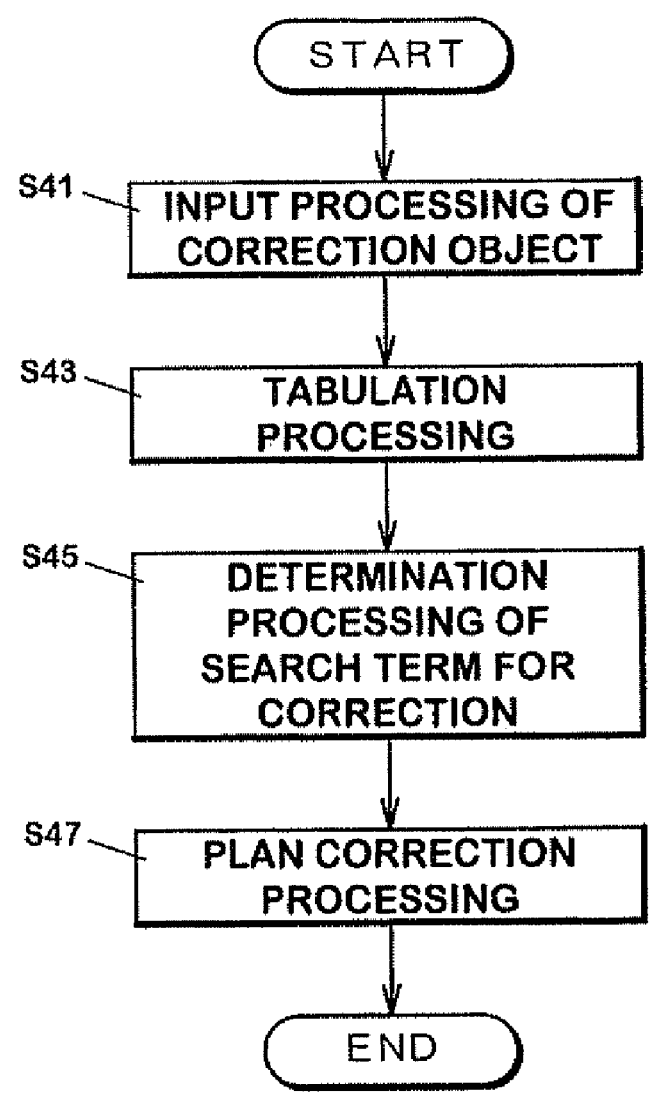
FIG. 18 is a flowchart of advertising medium correction processing.

Subsequently, the CPU 23 carries out tabulation of search history using the search result stored in a search term storage part wherein the search history is made using the search term "shampoo X" (FIG. 18 step S43). Detailed description of such tabulation processing because such description is similar to that of step S2 in FIG. 8. In this way, search results from 5/1 to 6/19 for the search term "shampoo X" illustrated in FIG. 20 is obtained.

The CPU 23 determines a search term having a similar variation history of search number to the search term "shampoo X" using therewith as a search term for correction using search history on the search term "shampoo X" (step S45). The details of step S45 will de described with reference to FIG. 21.

Figure 23:
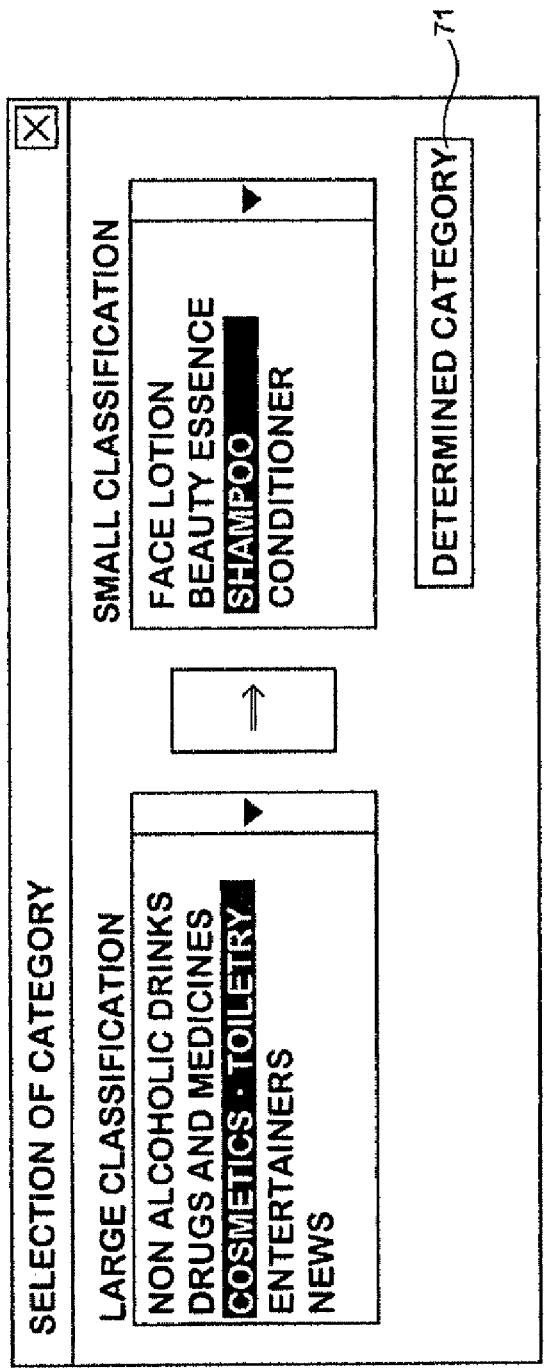
FIG. 23 is an example of a dialog box for specifying a classification in which the name of advertisement object belongs.
Figure 24:
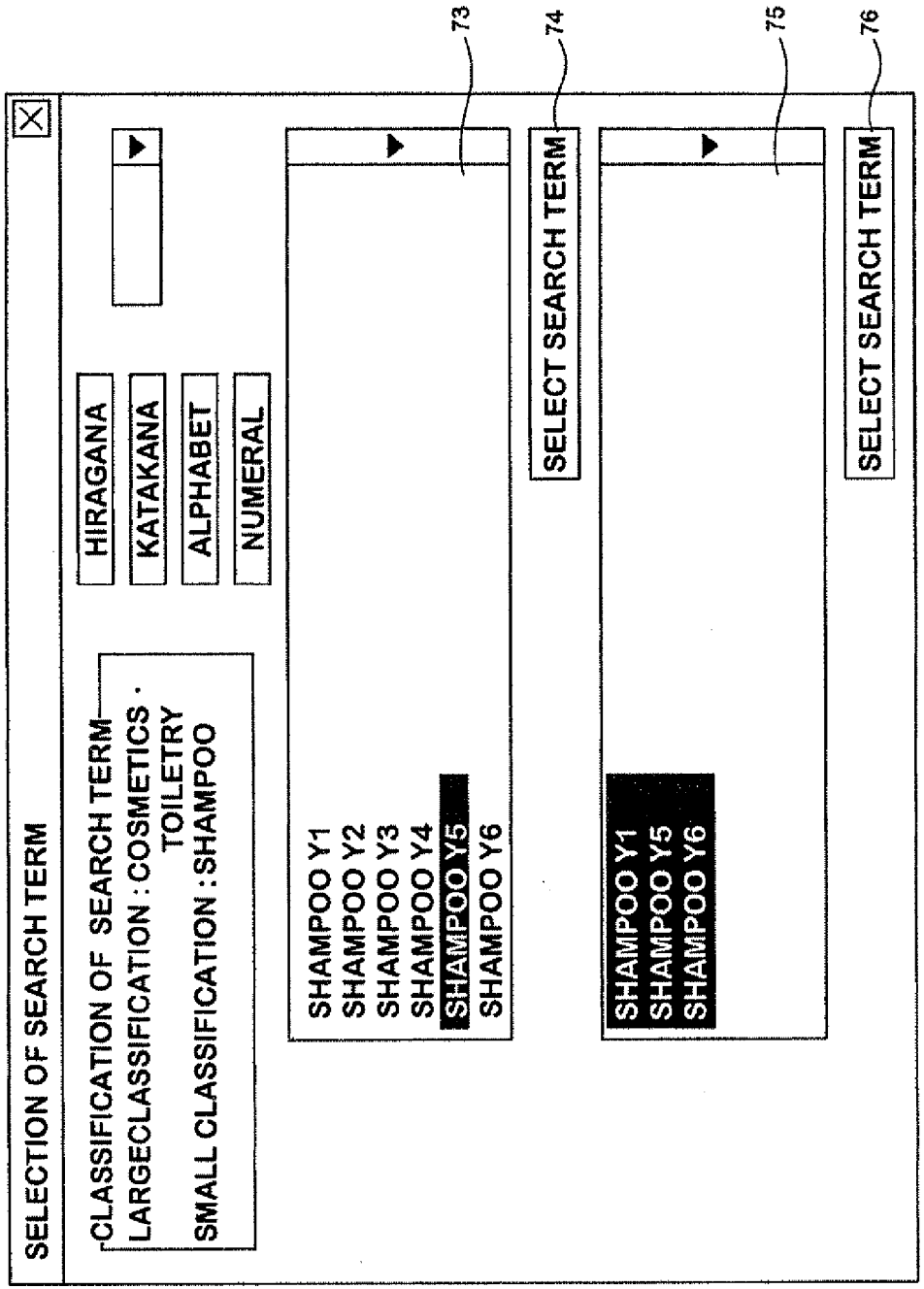
FIG. 24 is an example of a dialog box for specifying a classification to which the names of advertisement object belongs and a search term(s).

The CPU 23 carries out a range specifying processing (step S51). In this embodiment, as shown in FIG. 22, definition files defining hierarchic structure in which small classifications belonging thereto and large classifications to which the small classifications belonging for each search term are stored in the hardware 26 (see FIG. 2) and specifies which range of search terms is judged for similarities. In this embodiment, the operator can specify the range by displaying a dialog box shown in FIG. 23. Once a category is determined, the operator may select a determination button 71. In the case of performing judgment for similarity of partial search terms within the small classifications, let the operator to select by displaying a dialog box shown in FIG. 24. When a button 74 is selected for the search terms displayed on a region 73, the terms are displayed on a region 75. Upon completion of all the selections, the operator clicks on a button 76. In this case, it is assumed that shampoos Y1, Y5 and Y6 are selected.

Figure 21:
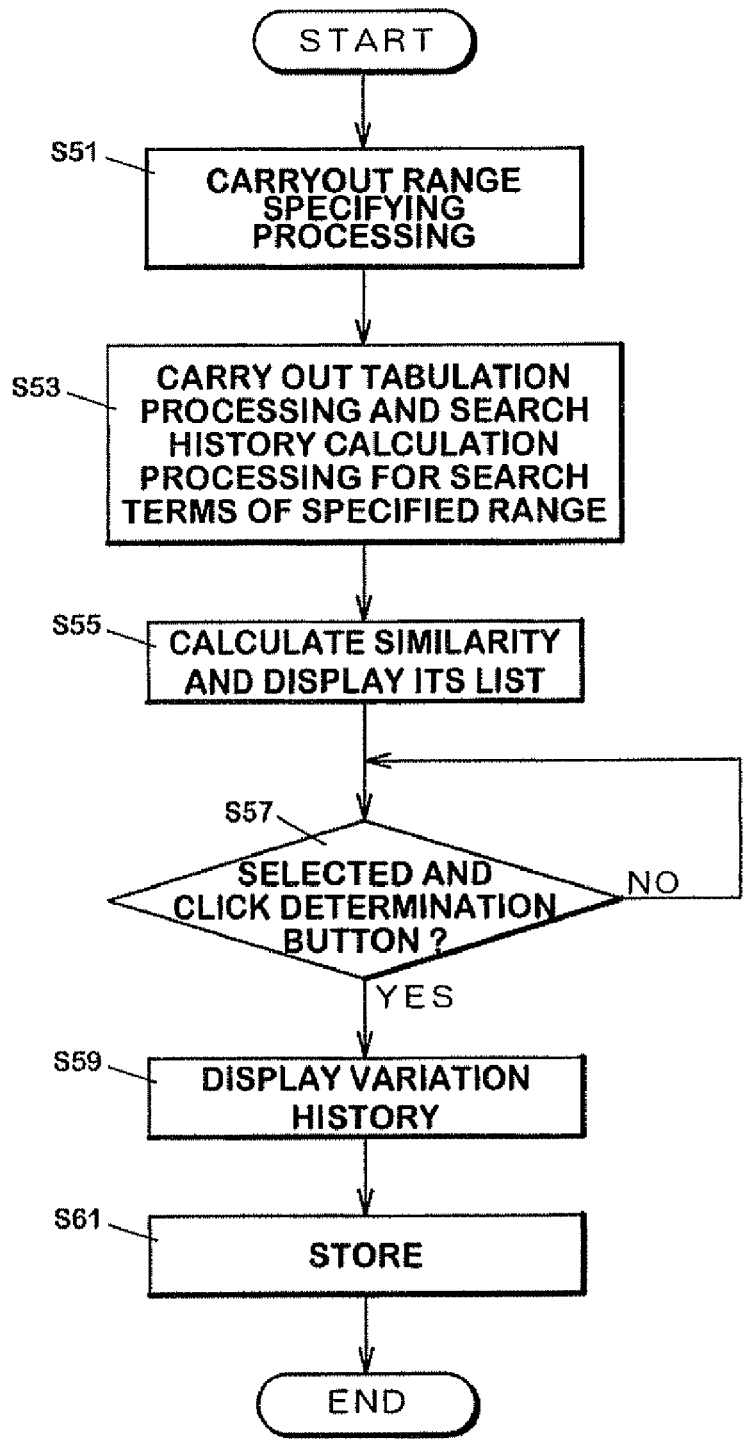
FIG. 21 is a flowchart of a search term for correction determination processing.

The CPU 23 carries out tabulation processing and search history calculation processing for the search terms of the specified range (FIG. 21 step S53). Detailed descriptions of the tabulation processing and search history calculation processing are omitted because these are similar to the above-described ones. In this way, variation history of search number for the shampoos Y1, Y5 and Y6 is obtained.

The CPU 23 calculates similarity between 50 days search history of the search term "shampoo X" from 5/1 to 6/19 and the variation history of search number for the shampoos Y1, Y5 and Y6 at the first 50 days and displays a list of the search terms and the similarity (FIG. 21 step S55). FIG. 25 shows such list the search terms and the similarity.

In this embodiment, although both coefficients of correlation of two variation history of searches are used as a method of calculating similarity, any other methods that can judge similarity of line chart such Euclidean distance or square sum and so on may also be used therefore. Further, plural calculation methods may be combined as well.

Figure 26:
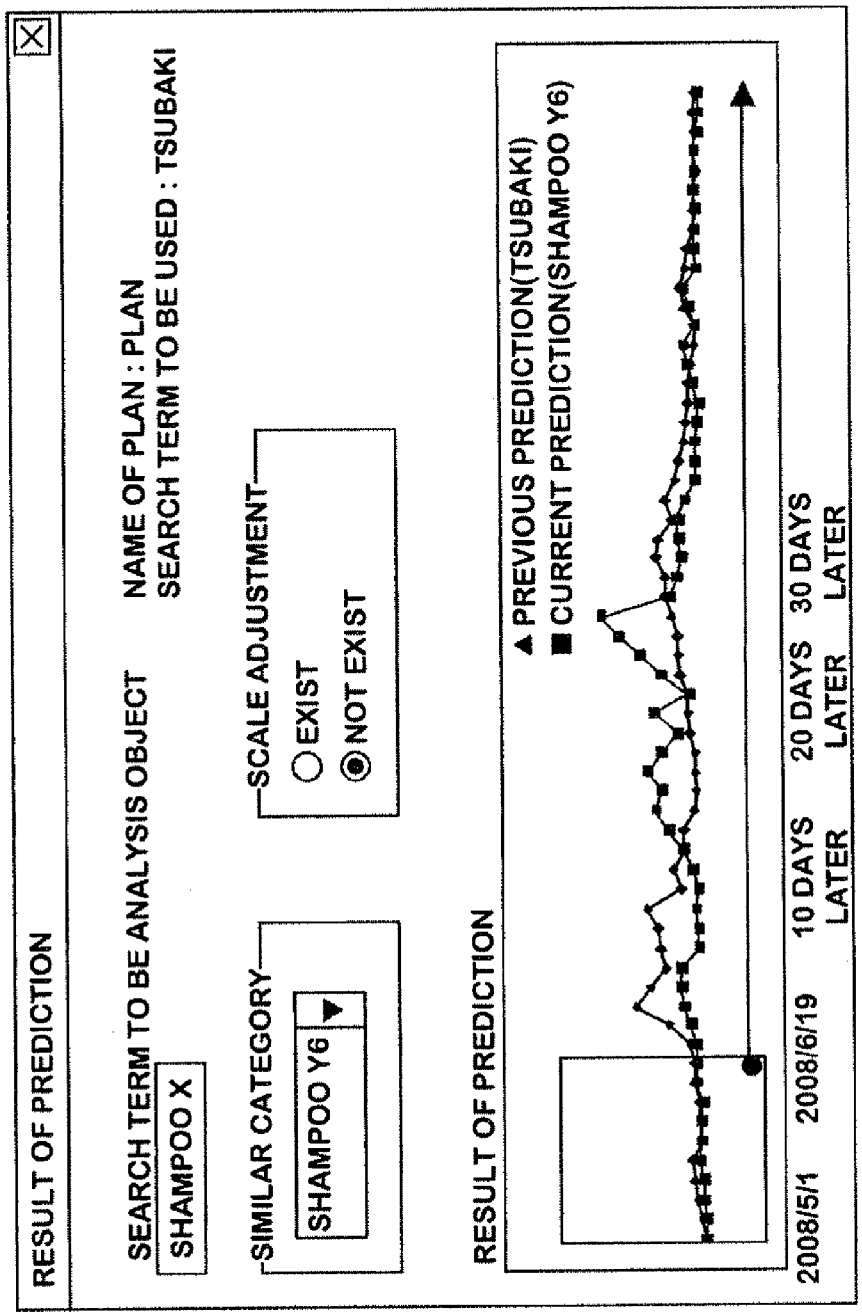
FIG. 26 is a display example of pre-corrected variation history of search number and post-corrected variation history of search number.

In this case, the operator selects the shampoo Y6 as a search term for correcting "plan A" related to "shampoo X" and clicks the determination button because the similarity of the shampoo Y6 has a relative high value such as 0.88. The CPU 23 judges whether the determination button is clicked (step S57), displays the pre-correction variation history of search number and the post-correction variation history of search number in a superimposed manner. An example of such display is shown in FIG. 26.

Upon completion of step S45 of FIG. 18, the plan A is corrected with the determined search term (step S47). Detailed description of such processing is omitted because these are similar to steps S3 and S5 of FIG. 8. No complete match for the number of segments at pre- and post-correction is obtained in step S3 of FIG. 8. Partial segments have already been completed by running actual advertisements. Therefore, additional correction(s) is made on the plan(s) created after the corrected plan(s) as well.

In general, advertisement contract signs up with medium providers for a certain period. Therefore, there might be a case that no correction for the contract that has already been ordered is accepted even advertisement plan itself is changed. For example, a correction has made on 2008/6/19 in this example, but determination has made that the magazine C will be the advertising media until 2008/6/30 for the segment C2 and the fact has already notified to the magazine C. Therefore, the order can not be cancelled. Running advertisement of multiple medium is performed for a part of advertising period in this embodiment, because desirable effect may be expected for performing a correction at an early stage thereof. In this embodiment, magazines H and C are determined as advertising medium from 6/20 to 7/30. Consequently, advertising media overlap from 6/20 to 6/30. Further, segments after 6/20 are defined two segments.

FIG. 27 shows an example of a list of plans at pre- and post-correction stage and FIG. 28 shows an example of summarized plans thereof. Both C2 and C2' may be displayed in a summarized manner in FIG. 28.

In this way, more realistic plans can be created by correcting the name of advertising object with the search term(s) having similar search history using actual search history(ies).

5. Specific Processing for Search Term

In the above-described embodiments, it is necessary for the operator to specify which search terms) is to use for creating initial plan(s). It is sometimes difficult to do such term specification appropriately even for a well-experienced operator. To solve such a problem, it is possible to classify search term(s) by category and may select a search term that belongs to the same classification. Specifically, definitions files shown in FIG. 22 are stored and the operator to specify one of classification and search term by displaying the dialog boxes shown in FIGS. 23 and 24.

In addition, a search term for creating a plan may be specified by the operator from variation history of search number by calculating the variation history upon selecting an arbitrary search term and by displaying the history.

6. Specification of Segments

In this embodiment, the operator specifies the number of segment. On the other hand, candidates for the segment may also be determined automatically by a computer. Details of automatic determination processing will be described with reference to FIG. 29. In this process, it is defined as one segment when one of the cases in which the number of search history increases and decreases.

Figure 29:
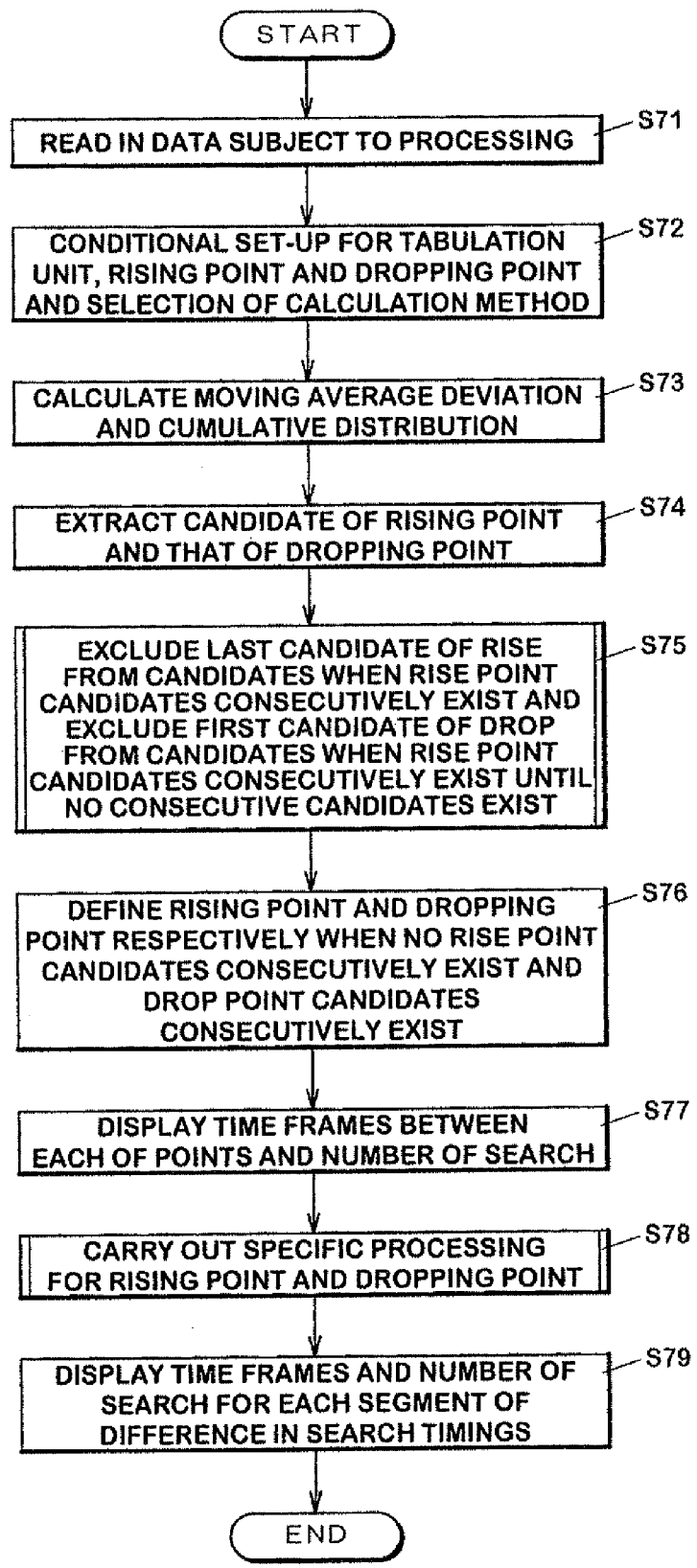
FIG. 29 is a flowchart of a process for specifying segments.
Figure 30:
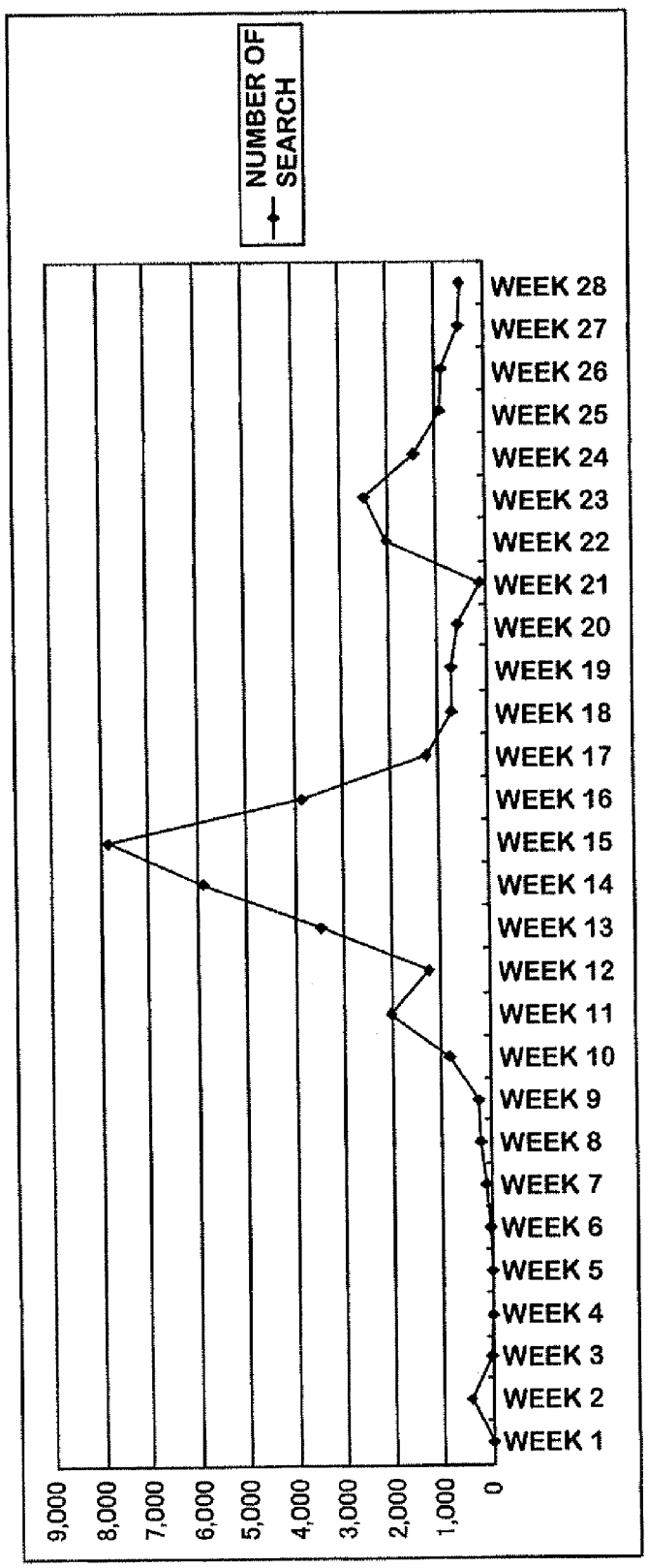
FIG. 30 is an example of variation history of the number of search.

The CPU 23 reads in object data to be processed (FIG. 29 step S71). Here, it is assumed that variation history of search number shown in FIG. 30 is provided. The CPU 23 carries out a specific processing on a conditional setup for tabulation unit, rising points and dropping points and a calculation method for the provided number of search history (step S72). In this embodiment, it makes the operator to input adequate data by displaying a dialog box shown in FIG. 31. In this example, the tabulation unit and the conditional setup for rising points have been set up respectively as "week", "three consecutive weeks" and "total rise of equal or more than 0.5%". Another conditional set-up for moving average "exists" AND "average of previous-four weeks". The same as applied for the dropping points.

Then the CPU 23 calculates moving average deviations and cumulative distributions (step S73). FIG. 32 shows the calculation results thereof.

The CPU 23 extracts candidates of rising points and that of dropping points (step S74). In this case, such candidates were extracted where one of raising and dropping of equal or more than 192 people in consecutive three weeks because the number of cumulative searchers is 38412 people and it is required that the rise and drop of equal or more than 0.5% for overall cumulative distributions continue more than consecutive three weeks. In this case, week 10 to week 16 and week 22 to week 25, and, week 17 to week 21 and week 26 to week 28 respectively extracted as candidates for rising points that for dropping points.

The CPU 23 excludes the last candidate of rise from the candidates when rise point candidates consecutively exist out of the extracted candidates in step S74 until no consecutive candidates exist and it excludes the first candidate of drop from the candidates when rise point candidates consecutively exist until no consecutive candidates exist (step S75). Consequently, week 11 to week 15, week 21 to week 25, week 17 to week 20 and week 26 to week 27 are excluded.

The CPU 23 defines a rising point(s) and a dropping point(s) respectively when no rise point candidates consecutively exist and drop point candidates consecutively exist (step S76). In this case, week 10 and week 22, and week 21 and week 28 are respectively defined as rising points and dropping points.

The CPU 23 displays time frames between each of such points (the rising points or the dropping points) and the number of search thereof (step S77). In this case, a total of five rising points and dropping points are defined and intervals C1 to C4 shown in FIG. 33 and such intervals are displayed in the above five points.

The operator carries out specific processing for rising points and dropping points with reference to such display (step S78). Specifically, an option, in which time frame is incorporated with its vicinity if the period is too short, may be carried out. In this case, the interval C3 is incorporated with the interval C4 locating behind it because the interval C3 is week 21 alone and the search ratio thereof is a low value of 0.1%. FIG. 34 shows a display example of the post-incorporation. In this way, the operator can exclude the segment(s) having less search number.

Figure 35:
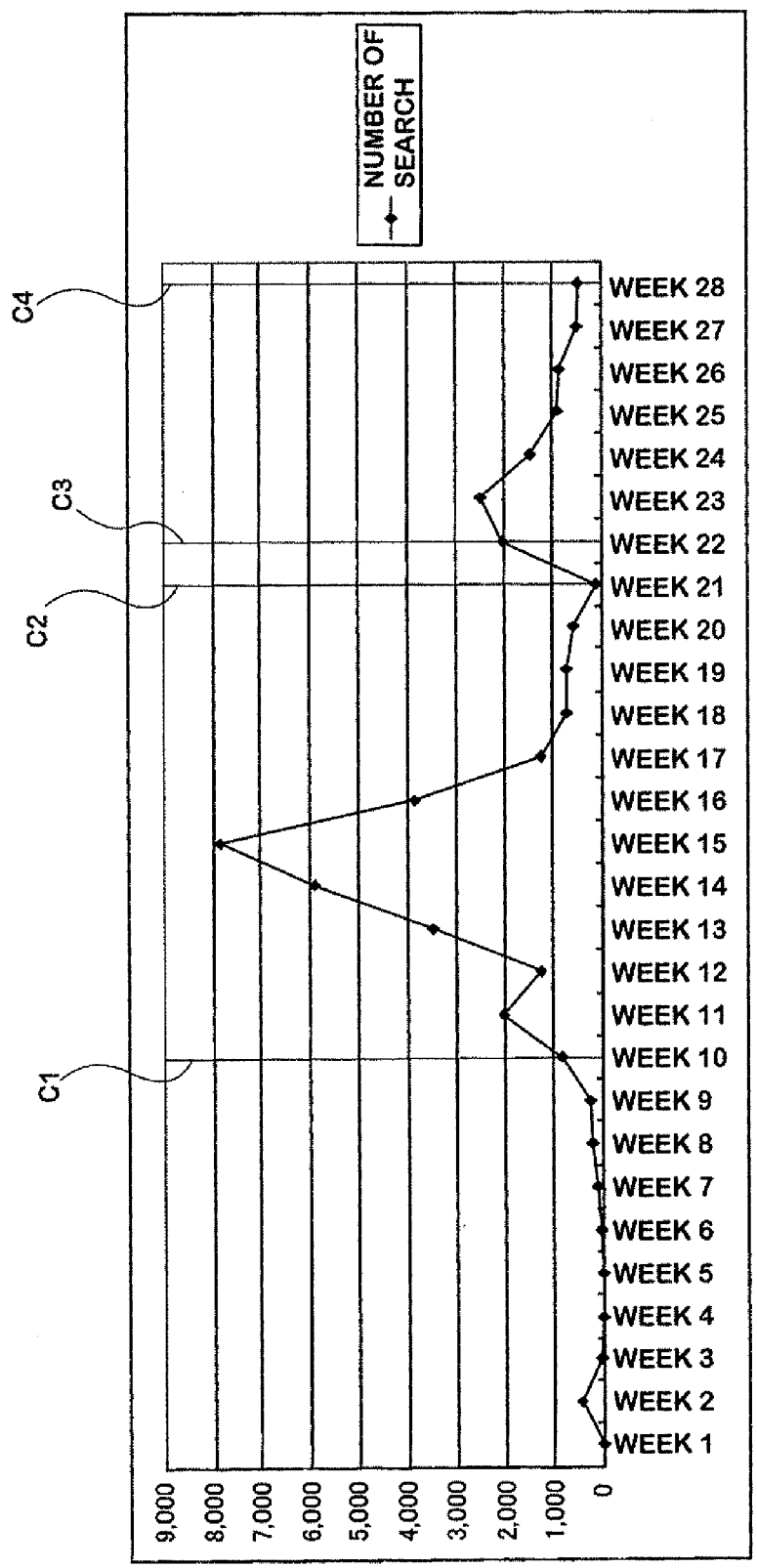
FIG. 35 is a diagram illustrating status displaying segment candidates on variation history of search number.

Then, the CPU 23 displays the periods and the number of search for each segment with the specified rising point(s) and the dropping point(s) (FIG. 29 step S79). FIG. 35 shows a display example thereof.

Although a list of values are displayed and correction there is performed in this embodiment, it is possible to carry out the specific processing in step S78 by displaying both a line chart and boundary lines and adding and deleting the boundary lines. Further, both of the above may also be displayed.

Hence, the boundary of segments can automatically be determined from the shape of variation history of search number. In this way, even an operator unfamiliar with segmentation of the variation history of search number cam defines the segments in response to the shape of the variation history of search number.

In the above-described embodiments, candidates are displayed, such candidates may automatically be determined.

Further, boundary lines for segmenting segments are defined using a moving average of the variation history of search number in this embodiment. Consequently, it is possible to carry out exclusion of week 2 having a short-term rise and detection of a rising trend including week 11 having a short-term drop.

7. Specification of Plural Search Terms

In the above embodiments, examples of specifying just one search term have been described, search terms defining to perform calculation of logical sum (or) and/or logical and (and) for plurality of search terms can be provided.

For example, if "a search term A AND (a search term 130R a search term C) is provided, an ID that fulfill such conditions may be extracted as it is. Specifically, conduct a search for one of the search terms B and C, and extract a searcher who conducts a search for the search term A as well as the search terms 13 and C. Each ID uses "the date conducting a search for one of the search terms B and C and searching the search term A" for the evaluation to the searcher. The earliest date for "conducting a search for one of the search terms B and C and searching the search term A" out of all the IDs may define as a population search date.

Such search conditions are effective in the case of needs for extracting and segmenting searcher(s) who conduct a search for plural search terms at the same period of time.

In addition, as to time difference for search, individual search timing difference is calculated for each search term and then that may be calculated in response conditions therefore. In this case, AND requirement calculates the maximum value and OR requirement calculates the minimum value. For example, individual search timing difference is MAX [10 days later, MIN (20 days later, 30 days later)]=20 days later when individual search timing difference is set at 10 days later from the population search date for the search term A, 20 days later from the population search date for the search term B and 30 days later from the population search date for the search term C.

Segment of individual search timing difference may be calculated for each of search terms for each search term and then that may be calculated in response conditions therefore. For example, individual search timing difference is segmented so that each having approximately five minutes (in the order C1 to C5, so as to arrange the terms in shorter period appears first). When segmentation is carried out as the search term A: C1, the search term B: C1 and the search term C: C2, individual search timing difference becomes MAX [1, MIN (1, 2)]=1 and segment of individual search timing difference comes to C1.

Such technique is effective in the case of needs for detecting and segmenting searcher(s) who conduct a search for plural search terms belonging to the same category at consistently early stage.

Hence, comprehensive evaluation of variation history of search number for each search term can be performed relatively by normalizing the search timing for plural search terms. Alternatively, the technique for the normalization is not limited to the above way such as classifying in segments, but an ordinary technique(s) for normalization may also be employed.

When the search condition is defined for carrying out a logical AND calculation for plural search terms, there might be cases in which no search result exists therein or obtaining search result greatly differ from other result if the result does exist therein. In that case, it is possible to evaluate in the above way, but the evaluation can also be performed under a partially eased condition as described below.

For example, the following causes are considered for the reason why there are no search results for a certain search term out of the search terms specified for carrying out logical AND calculation. One of the causes is lower sensitivity of the user to the search term. Another cause is not relative to the sensitivity to the information such as the cases that one of no search is carried out due to already known search term and due to accidentally no interesting on such search term. It is not necessary for the user to extract the search term if he/she has lower sensitivity on the term, but for the latter case, the term preferably be extracted. Extraction may be carried out for such user in the following way.

In what follows, the case in which segment of individual search timing difference is calculated for each search term will be described. For example, it is assumed that search terms "search term W1 AND search term W2 AND search term W3 AND search term W4 AND search term W5" are provided and the following search results are obtained.

UseR U1: search term W1 to search term W5: all the terms belong to segment C1

User u2: search term w1 to search term w5: all the terms belong to segment c5

User U3: search term W1 to search term W4: all the terms belong to segment C1, search term W5: the term belong to segment C5.

Hence, for evaluation, judgment using the maximum values, minimum values, average values, mode values and threshold values (for example, if more than a predetermined number belonging to a certain segment, it is judged that the search term is recognized as such segment) can be performed, if the search term W1 to search term W4 belong to segment C4, but the rest belongs to another search term W5, like the user U3. The following calculation technique is feasible, specially when no search result exists for a part of the search terms to which logical AND calculation is imposed, for example, in the case of conducting actual search for the search terms W1 and W2 by a user but no actual search for the search term. W3.

1) The IDs satisfying all the conditions are extracted. In other words, any IDs having any deficit are eliminated.

2) Individual search timing difference is calculated for each search term and then that is calculated in response conditions therefore. For example, it is assumed that individual search timing difference of a person i for a search term j is defined as NA when any deficit value exist and defined as search time (ij) when no deficit value exist. During the calculation of data containing any deficit value as an object, AND condition and AVERAGE condition are defined as NA and OR condition is set to the minimum value (NA, if all the values are NA). On the contrary, during the calculation of data not containing deficit value as out of the object, AND condition is set to the maximum value except for NA (NA, if all the values are NA), AVERAGE condition is defined to the average value except for NA (NA, if all the values are NA) and OR condition is set to the minimum value except for NA (NA, if all the values are NA). Segmentation of time difference is carried out similar to the case of selecting one search term subject to setting the segment of individual search timing difference using T (i) to be defined as individual search timing difference that is calculated in response to conditions.

3) Segmentation of individual search timing differences is calculated for each search term and then that is defined in response conditions therefore. In the above 2), the calculation is carried out with difference in days, but this calculation method differ from the above in that segments are obtained and the calculation is carried out with such segments. Specifically, a method of segmentation is set and the segment of individual search timing differences of a person i for a search term j is defined as NA when any deficit value exist and defined as segment of search time difference c(ij) for each search term when no deficit value exist. As to i, positive integers such as 1, 2, 3 so on are provided at early segments and calculation is carried out provided that C(i) equals to i. During the calculation of data containing any deficit value as an object, AND condition and AVERAGE condition are defined as NA and OR condition is set to the minimum value (NA, if all the values are NA). On the other hand, during the calculation of data not containing deficit value as out of the object, AND condition is set to the maximum value except for NA (NA, if all the values are NA), AVERAGE condition is defined to the average value except for NA (NA, if all the values are NA) and make it to a positive integer by performing round off thereof. OR condition is set to the minimum value except for NA (NA, if all the values are NA). Tabulation may be carried out using C (i) to be defined as segment of individual search timing differences that is calculated in response to conditions.

8. Other Embodiments

In this embodiment, the case, where the search results using search engines on the internet have already been stored, has been described, but in the case of performing the correction processing the search results until starting such processing may be stored.

In this embodiment, the case where information for specifying target attribution and data on search term are stored in the advertising medium determination device has been described as an example, it is possible to configure such that one of these data or both data is stored in another computer (for example, a center server) and reads out such data through a network.

For acquiring search results, it is possible to configure such that installation of a program for storing history of using search engines within the user's PC is required during the user registration, storing search term(s) and search at each search and send them to the center server regularly or irregularly. In this way, well-known technique can be employed for the method of collecting search results.

In the above described embodiment, the operator inputs the search term(s), the search term(s) belonging to a certain category corresponding to the name of advertising object can automatically be determined by storing search term(s) that is classified into categories. Further, they may be displayed as candidates and can be selected one of these.

Search term(s) may be specified by carrying out steps of storing variation history of search number for each search term and displaying the histories to the operator and asking for selecting one of the histories.

Segment may be determined using a segment determination rule(s) for segmenting into a predetermined number, wherein the segment determination rule(s) is stored.

The segment may be determined using segment of search term for category to which a search term(s) belong, wherein the search term(s) classified into category is stored.

The search terms specifying means may automatically specify a search term(s) including the variation history of search number similar to that of the name of advertising object being inputted when the name of advertising object is input as an object for correction. In addition, instead of automatic specification, it is possible to provide the selected search term(s) to the advertising medium data determination means as a word to the name of advertising object.

In this embodiment, days are used for basis of various time frames, but week, month, or even morning, afternoon, hours (for example, three hour basis) and so on may arbitrarily be applied.

Also, segment is specified in the form of mm/dd-to-mm/dd, but it is possible to specify segment relatively in a relative period such as one month later from a certain date.

As to tabulation segment, arbitrarily time intervals such as one month and so on may be set. Further, search date and hour of population may also be set arbitrarily. For example, monthly tabulation will be carried out by setting the population search date arbitrarily as January 1 and the tabulation segment in one month. This enable to correspondence to a segment in a calendar-form.

In the above-described embodiments, the candidate(s) is determined at the step S33 in FIG. 13, such candidate(s) may also be determined with a value considering advertisement cost(s). Specifically, such candidates may be arranged in the order of having higher medium contact ratio per unit cost (the value obtained by dividing the contact rate by an advertisement cost). For example, as shown in FIG. 14, the contact ratio of magazine A is 12.3%, that of magazine B is 10.5% that of magazine C is 7.5%, that of magazine D is 4.5% and that of magazine E is 2.5% respectively. In this case, the contact ratio per unit costs become 0.12 for the magazine A, 0.15 for the magazine B, 1.0 for the magazine C, 0.075 for the magazine D, 0.083 for magazine E when the advertisement costs are stored as a million yen for the magazine A, 0.70 million yen for the magazine B, 0.75 million yen for the magazine C, 0.60 million yen for the magazine D and 0.30 million yen for the magazine E. These are arranged in the order of the magazine 13, the magazine A, the magazine C, the magazine E and the magazine D when the magazines are arranged in descending order.

Alternatively, advertisement cost per unit medium contact ratio (the value obtained by dividing an advertisement cost by the contact rate) is calculated and the candidates may be arranged in ascending order.

Further, candidates may also be determined with content rate. The content rate is a rate in each segment in the case of paying attention on a specific advertising medium. For example, the content rate of a segment C1 for the magazine E becomes 850 divided by 1000 equals to 0.85 when the number of users who belong to each of the segments C1, C2, C3 and C4 is 850, 100, 20 and 30 respectively in the case of existing 1000 users in the entire segments who memorize the magazine E as an advertising medium they frequently contact with. Hence, it is possible to extract an advertising medium to which users who belong to the segment frequently contact with by utilizing the rate to be determined by the relationship of other segment(s). Further, as to the content rate, candidate(s) may also be determined with a value considering advertisement cost(s) as described in the above.

In addition, candidate(s) may further be determined by combination of the medium contact ratio and/or the content rate and further considering the costs thereto. The combination may be one of a simple AND condition and OR condition and may be a total point calculated by multiplication of a predetermined coefficient.

In the above-described embodiments, the CPU is used for realizing each of the functions with programs. However, a part or entirety of the functions may also be realized with hardware such as logic circuit and so on.

Alternatively, a part of processing of the programs may be performed by the operating system (OS).

Figure 36:
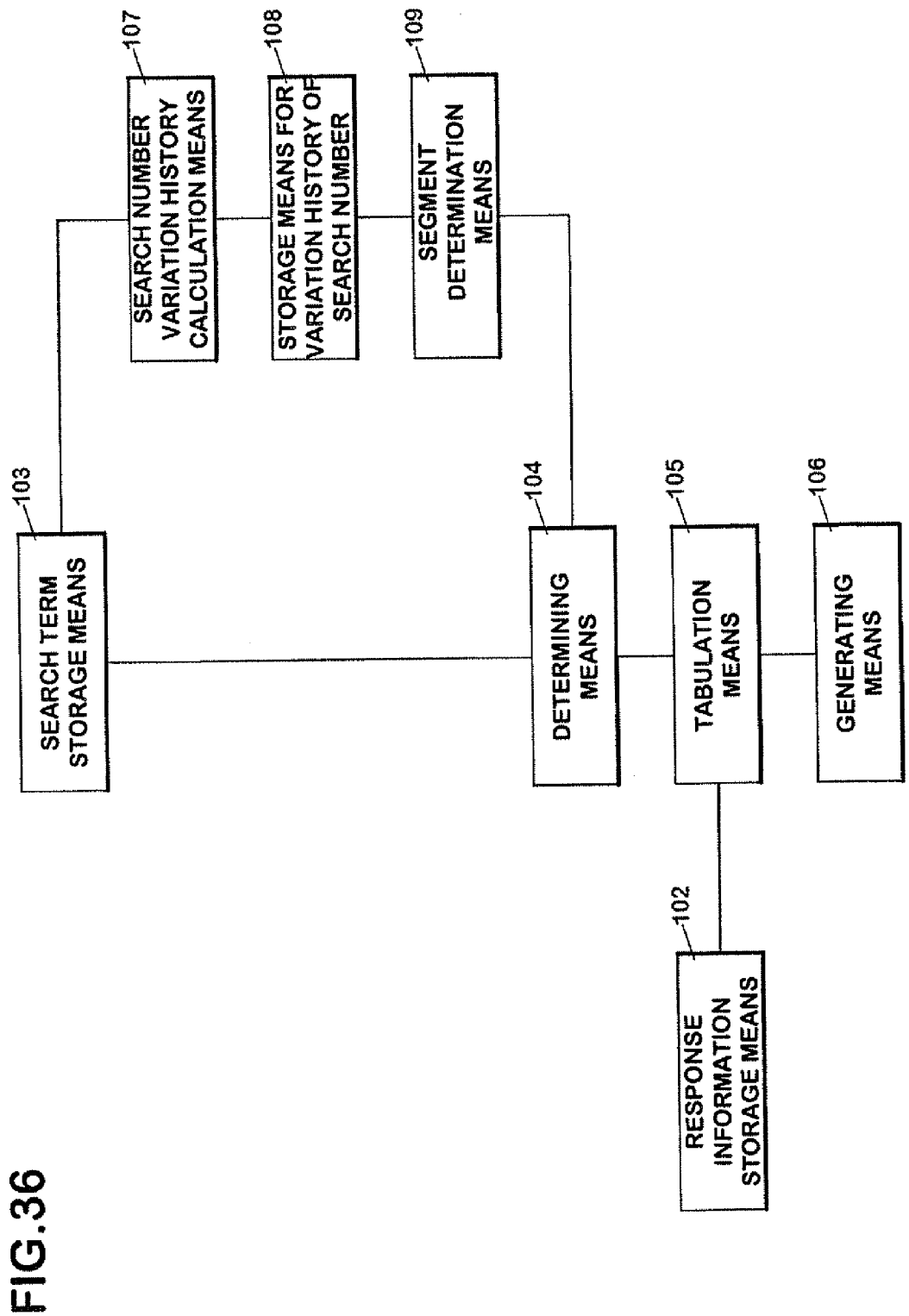
FIG. 36 is a functional block diagram of a questionnaire result analysis-supporting device 100.

A questionnaire results analysis supporting device by varying the above described embodiment. FIG. 36 shows a functional block diagram of a questionnaire results analysis-supporting device 100. The questionnaire results analysis supporting device 100 comprises response information storage means 102, search term storage means 103, determining means 104, tabulation means 105, generating means 106, search number variation history calculation means 107, storage means for variation history of search number 108 and segment determination means 109.

The response information storage means 102 stores response information for questionnaire made for expressing either applied or unapplied for plural questions correspondently with respondents' IDs. The search term storage means 103 stores a search term(s) by which a search is conducted at a specific search site correspondently with its search timing and searcher's ID who conduct the search. The determining means 104 extracts search timings of the search term for each searcher's ID from the search term storage means 103, segments the extracted search timings into a predetermined number in chronological order, and determines the user specified by its respondent ID corresponding to the searcher's ID as the user at each segment. The tabulation means 105 arranges each of the segments in a direction of first axis of a cross tabulation for the items that is responded as applied out of the response information for questionnaire stored in the response information storage means 102 and arranges each of the items of the response information in a direction of second axis of the cross tabulation and carries out cross tabulation for the number of person belonging to the each item in each of the segments. The generating means 106 generates data arranging therein cells belonging to the extracted items by extracting equal or more than one or two items specified by the operator out of the arranged items in either the first or the second axis.

Further, the generating means 106 generates data for performing highlighted display enabling easy recognition of a cell(s) having unique value(s) from other cell(s) by comparing the value of cell(s) arranged in a direction of the first axis with that arranged in a direction of the second axis. In this way, highlighted display enabling easy recognition cells having unique value(s) from other cell(s) out of cell(s) belonging to specific item(s) arranged in a direction of the first axis. Further, characteristic analysis between users who conduct search for different item(s) at different period(s) can easily be performed when equal or more than two items are extracted.

The search number variation history calculation means 107 calculates variation history of search number representing chronological variation of search number for each search term stored in the search term storage means 103. The storage means for variation history of search number 108 stores the calculated variation history of search number. The segment determination means 109 determines segments in accordance with the shape of the variation history of search number. The determining means 104 extracts the searcher's ID using the segments provided from the segment determination means 109.

Although, the case where the response information storage means 102 and the search term storage means 103 are stored within one questionnaire results analysis supporting device has been described in the above described embodiment, separate read out of these may be performed by storing each means into separate computers. Alternatively, the case where the response information storage means 102 and the search term storage means 103 may be realized with one computer.

9. Hardware Structure

Figure 37:
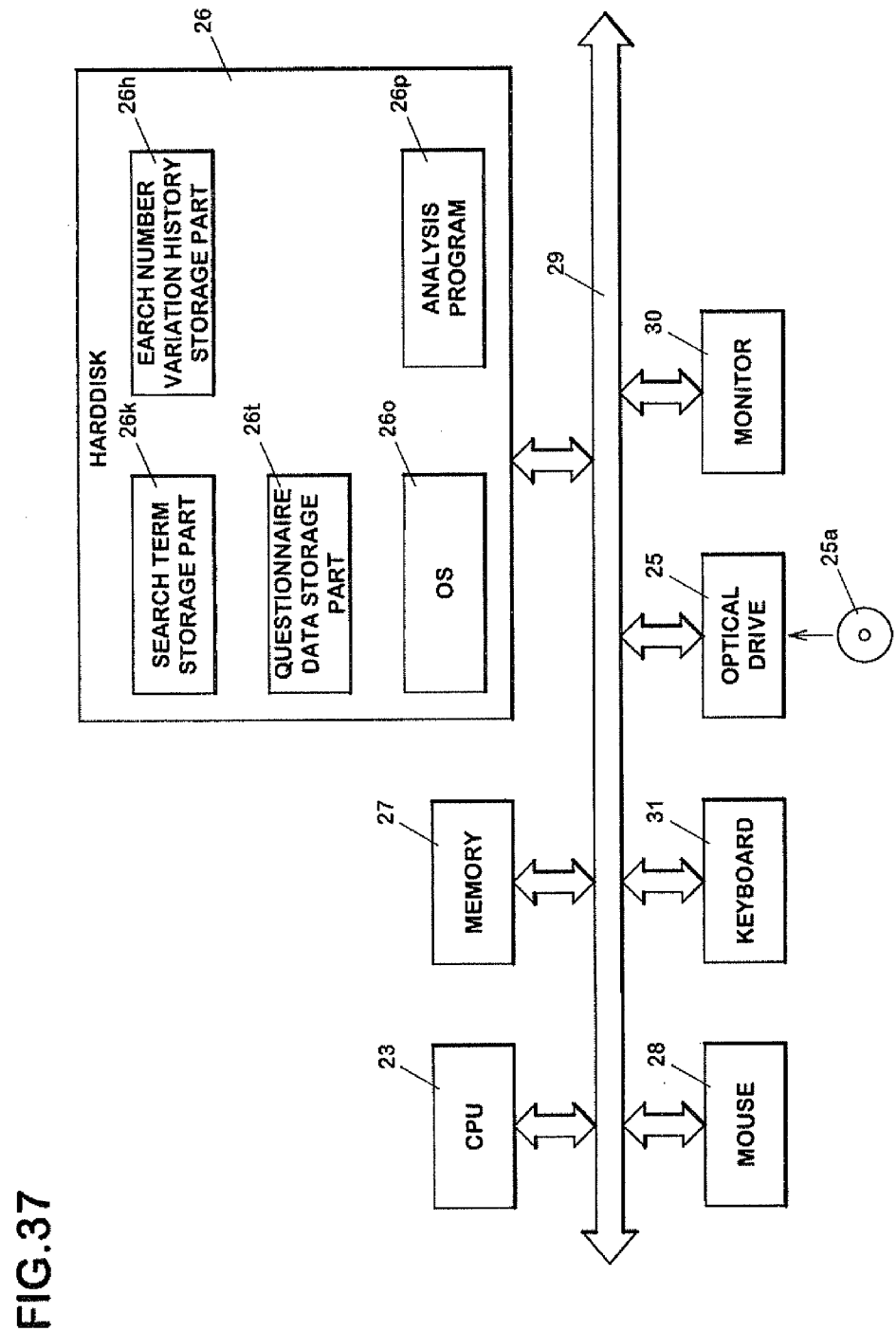
FIG. 37 is an example of hardware structure of the questionnaire result analysis-supporting device 100.

The hardware structure of the questionnaire results analysis-supporting device 100 is similar to that of the advertising medium determination device 1 shown in FIG. 2 except for the program(s) and the data stored in the hard disk 26. As shown in FIG. 37, an analysis program 126$p$, a search term storage part 126$k$, a questionnaire data storage part 126$t$ and a search number variation history storage part 126$h$ are stored within the hard disk 26 of the questionnaire results analysis-supporting device 100.

In the search term storage part 126$k$, user IDs and the timing of searches are stored as searchers' IDs who conduct searches for each search term as shown in FIG. 38A. Table format in which data is organized for each user ID is used in this embodiment, but it is not limited to that format and data may also be stored in chronological order of the timing of search as shown in FIG. 38B. In this embodiment, date of search and time instant are stored as the timing of searches, instead date of search alone may be stored. Such search timing and users' IDs for each search term may store the search term and its search timing for the searches using search engines on the Internet for each user targeting the users who login a portal site for example.

As shown in FIG. 39, search result data is stored for each user in the questionnaire data storage part 126$t$.

For example, the user having a user ID 10001 responds that these items to be responded for the questionnaires such as "tend to pay attention on hair care", "anxious about overly dry hair", "tend to pay attention on dress-up", "tend to sensitive to the fashion" as they all applied (Yes) to him/her-self.

He/she answered that the items to be responded for the questionnaires on advertising medium "magazine B", "TV program A", "TV program B" and so on as they all not-applied (No) to him/her-self. He/she answered that the items to be responded for the questionnaires on actually recognized advertising medium "TV advertisement of shampoo A", "banner advertisement of shampoo A", "Web-site for shampoo A" and on previously bought product(s) "shampoo C" as they all applied (Yes) to him/her-self.

As will be described later, "date and hour", "number of search respondent", "users' IDs" for each search term are stored in the search number variation history storage part 126h as variation history of search number representing chronological variation of search number by tabulating each of search terms stored in the search term storage part 126k. For example, for a search term shown in FIG. 40, one search is carried out on 2008/5/1 by one searcher having ID of "10011". In addition, three searches are conducted on 2008/5/2 by three searchers having ID of "120303", "10013" and "10024". Thus, variation history of search number in chronological order is recorded in the search number variation history storage part 126h.

10. Analysis Processing

Analysis processing for questionnaire will be described with reference to FIG. 41. The CPU 23 carries out input processing of object term for search that becomes an axis for cross tabulation (step s101). Such processing may be carried out by the CPU 23 to prompt input into a dialog box shown in FIG. 42 to be displayed on the monitor. The object term for search is set-up by inputting the search term(s) clicking a button 134. In the below example, it is assumed that "shampoo a" is input therein as the object term for search.

Figure 43:
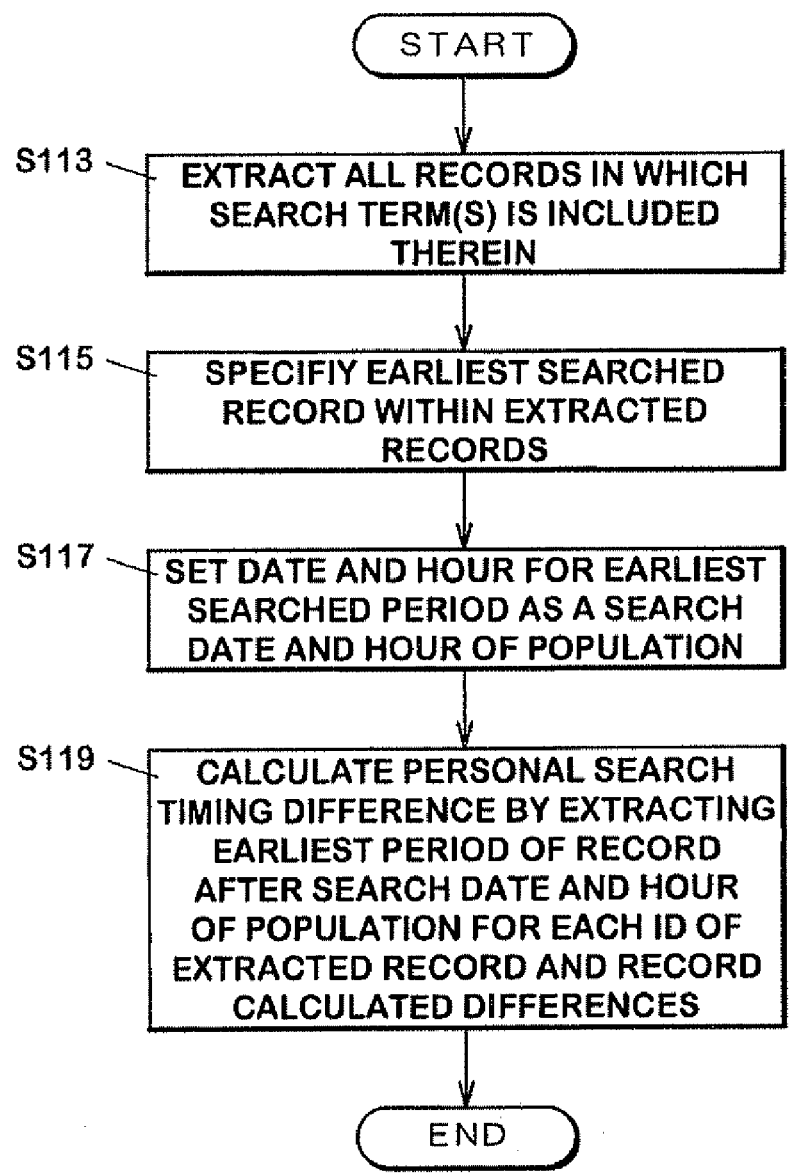
FIG. 43 is a flowchart of tabulation processing.

Then the CPU 23 carries out tabulation processing of search history for specified search term(s) (step S102). The detail of tabulation processing is shown in FIG. 43.

The CPU 23 extracts all the records in which the search term(s) is included therein (step S113). In this ease, the CPU extracts a searcher ID "10001", search date and hour "2008/8/5", a searcher ID "10002", search date and hour "2008/6/1", a searcher ID "10003", search date and hour "2008/7/16", a searcher ID "10004", search date and hour "2008/9/1", a searcher ID "10005", search date and hour "2008/6/24" and so on because the search term is "shampoo A".

The CPU 23 specifies the earliest searched record within the extracted records (step S115). Then the CPU 23 sets the date and hour for the earliest searched period as a search date and hour of population for the search term (step S117). For example, in the ease shown in FIG. 38A, the search date and hour of population for the search term "shampoo A" become 2008/5/1.

Depending on the search term being input at step S101, the search date and hour of population therefor could be far in advance. In that case, it is possible for an operator to input arbitrary date and hour by displaying the search date and hour of the population calculated at step S117 on the monitor and ask for him/her to confirmation "search date and hour of population is a certain yy/mm/dd, is it OK?".

The CPU 23 calculates individual search timing difference by extracting the earliest period of record after the search date and hour of population for each ID of the extracted record and records the calculated differences (FIG. 43 step S119). In this embodiment, days are used as individual search timing differences. But, in the case of FIG. 38A, the search date and hour 2008/5/11, respondent number "1", searcher's ID "10011", the search date and hour 2008/5/2, respondent number "3", searchers' IDs "12303", "10013" and "10024" and so on shown in FIG. 40 can be obtained as the number of respondents of searches per day and respondents' IDs. The unit for tabulation may be input arbitrarily such as a week, a month or morning, afternoon, a certain period (for example three hours).

When plural searches for the same search term(s) are conducted, the earliest date thereof is the earliest search date and time for the user and the difference between the earliest search date and time and the search date and hour of population becomes a individual search timing difference for the user.

Figure 41:
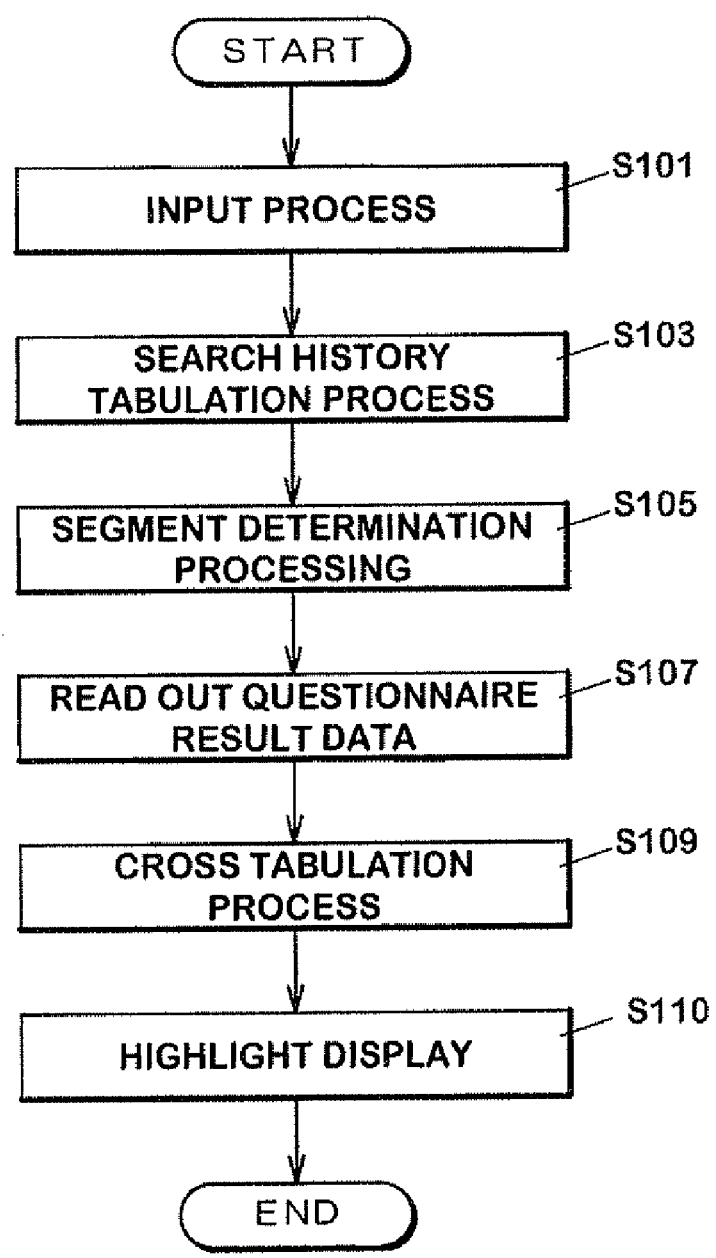
FIG. 41 is a flowchart of analysis processing.
Figure 42:
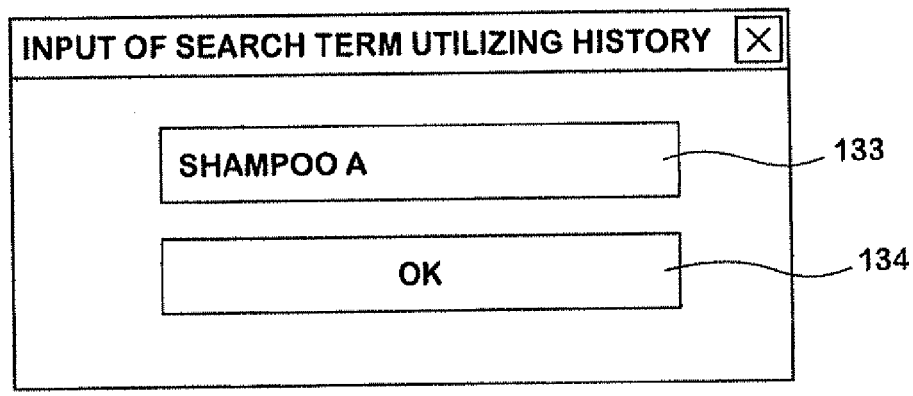
FIG. 42 is an example of a dialog box to be displayed.

Upon completion of the tabulation processing, the CPU 23 carries out segment determination processing (FIG. 41 step S105). In this embodiment, the steps of displaying variation history of search number for the search term by which the above variation history data of search number is generated, chronologically segmenting such data into a predetermined number using the search timing as a key with reference to the variation history by the operator, segmenting from the beginning of the search to the end thereof for the search term into a predetermined number, and extracting user IDs that belong to each of the segments. Such processing will be described herein.

Figure 44:
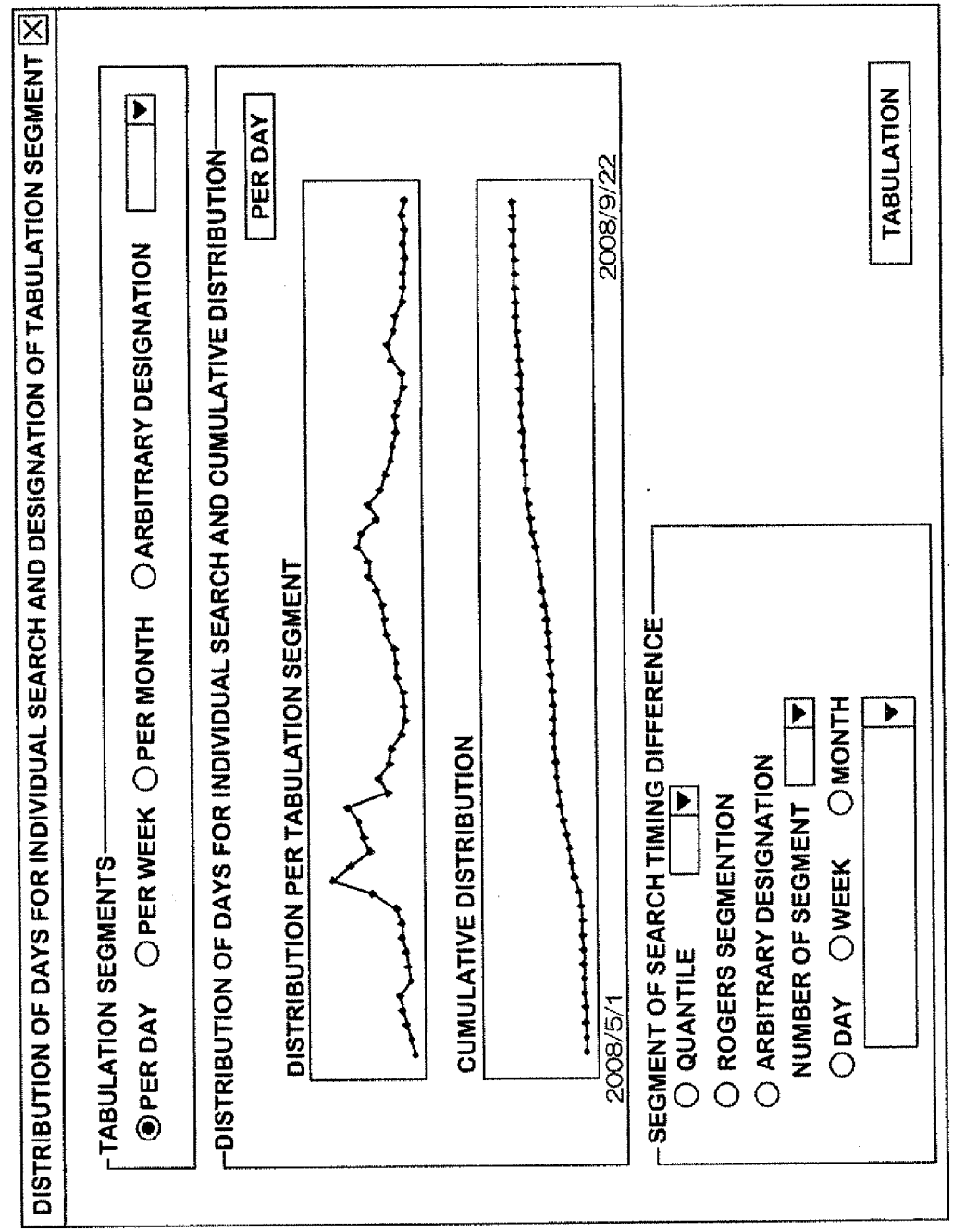
FIG. 44 is a display example of variation history of search number.

The CPU 23 displays line charts in accordance with the above variation history data of search number. In this embodiment, such line charts takes the abscissa axis and the ordinate axis respectively as dates (individual search timing differences) and the number of searches. Consequently, a tabulation segment distribution shown in FIG. 44 is displayed. The operator designates a method of segmentation and the number of segments with reference to such distribution. In this way, the number of segments is determined. In description below, it is assumed that the number of segments five is designated under the segmentation based on quantile. The segmentation based on quantile is a segmentation in which total search number is equally segmented into a predetermined segment number. In this case, the total number is segmented into five by dividing until each of the total reaching to 20% of the total because the number of segment is five. An example of post-segmentation data is shown in FIG. 45.

For the method of segmentation, various methods such as The innovation adoption curve of Rogers and so on other than the quantile may also be employed. Further, calendar-form segmentations such as monthly segmentation and time-segmentations starting at a search date and hour of population can also be used. Subsequently, the CPU 23 reads out questionnaire result data (FIG. 41 step S107). In this case, it is assumed that the questionnaire result data shown in FIG. 39 is read out.

Then the CPU 23 classifies questionnaire targets in segments determined at step S105 for plural items in the questionnaire result data, uses the resulting segments as one axis and the carries out cross tabulation processing using another questionnaire items as another axis (step S109).

Conventional tabulation method can be used for the cross tabulation processing. In this embodiment, a cross tabulation, in which the distribution of people is represented in percentage by employing the segments as row of table and by employing questionnaire items as column of table, is carried out. Consequently, the tabulation result shown in FIGS. 46 and 46b is obtained. Specifically, the value of each item is displayed in percentage that is divided by the total number of people who belong to a segment in this embodiment. Actually, analysis results in which the ratio of users belonging to segment C1 and who recognize a TV advertisement of shampoo A is 42.5% and the ratio of users belonging to segment C2 and who recognize the TV advertisement of shampoo A is 54.6% and so on are obtained.

In this embodiment, cross tabulation is carried out by assigning people who do not conduct search on the column of table in this embodiment (see FIGS. 46 and 46*b*). This enables an analysis that considers the characteristic of the people who do not conduct search.

Subsequently, the CPU 23 performs highlight display for cells having unique value(s) (FIG. 41 step S110). In this embodiment, highlight item processing data for easily recognizing from other item(s) during their display is generated for the item(s) having more than 3% higher value than that of the average value of each segment.

FIG. 47 shows an example of a part of such display. In this case, the average ratio of users belonging to segments C1 to C5 and who select the TV advertisement of shampoo A is 40.2% and belonging to segment C2 and who select the same is 54.6%. The CPU 23 judges whether the difference between the value of each item and the average value has more than a predetermined value. In this case, the difference between 54.6 minus 40.2 equals to 4.2, which is more than the predetermined value three. On the other hand, none of the differences for other segments C1 to C5 exceeds the predetermined value. Therefore, the CPU 23 carries out highlight display on a region 161 of the segment C2. The same applied to other regions 162 through 168. Such highlight display enables more easily recognition of characteristics of the users who belong to segments C1 to C5.

FIG. 48 shows a display example of the overall highlight display of each item. An analyzer of questionnaire recognizes the facts that the questionnaire respondents who conduct a search for "shampoo A" at early stage largely correspond to "teens", "tend to pay attention on hair care", "anxious about overly dry hair", "sensitive to the fashion" and the ratio of contact to their contact medium such as "magazine B", "TV program B" is high. In this way, analytical result, through which an advertisement appealing hair care and overly dry hair should run thereon, is obtained. In addition, appropriate marketing strategies may be planned because the questionnaire respondents who conduct a search at later stage largely correspond to "thirty something" and the ratio of contact to their contact medium such as "TV program A" is high.

Marketing measures including more advertisements that are appropriate can be implemented in response to timings such as before, the right after and after a while of releasing products even in the marketing strategies including advertisement by practically using the tabulation utilizing search timings.

More sophisticated consumer characteristics, that can not be obtained through the tabulation according to conducting search or not, can be recognized by utilizing search timings because characteristics between "a person who conducts a search at early stage when not much people know the product" and "a person who conducts a search at later stage when much people know the product" even though these who have conducted searches for "shampoo A".

In addition, since those who conduct search for the product have strong interest thereto, it is possible to recognize the timing when such person had participation to the product. Accurate search timing can be recognized because of its superiority of representativeness of the population in light of the ratio of people who currently conduct searches on the Internet and of having variation history data of search. Further, purchase of such product or not may also be complemented through a questionnaire search.

Previously, there are methods of screening a consumer(s) who bought a product(s) from the research monitors in addition to a method of attaching a questionnaire sheet thereto. For example, a question "have you bought XX before or not" is asked in advance or in the initial question thereof in such method and only the person who responds YES to that question continuously responds further questions and so forth. In this method, however, only insufficient number of samples can be obtained when the product(s) is not popular and extra cost is required to do that. The present invention solve these problems even such unpopular product.

The present invention uses the searcher who conducts a search for a search term as one axis of cross tabulation. Consequently, a questionnaire considering potential purchaser(s) for newly released product can be gleaned and sufficient number of samples can be secured even when less purchaser(s) exits for the product. Previously, it is very difficult to specify "time of purchase" data on purchase on sale (POS)/personal trading history data exists. Further, search, tabulation string-attached to the data on purchase on sale (POS)/personal trading history data either secures insufficient number of samples or tend to be biased because distribution channels of the product and their area is limited. The present invention solves these problems and enables an analysis that adds a tingle of the sensitivity to information.

11. Other Embodiments

In the above embodiment, the cross tabulation is obtained as a cross tabulation while performing highlight display on the cell(s) having unique value(s), but the operator may select markings such as the type of tabulation and highlight display. For example, it is possible to display a tabulation instruction input window shown in FIG. 49 prior to step s109 in FIG. 41 and make the operator fills in the window.

Figure 49:
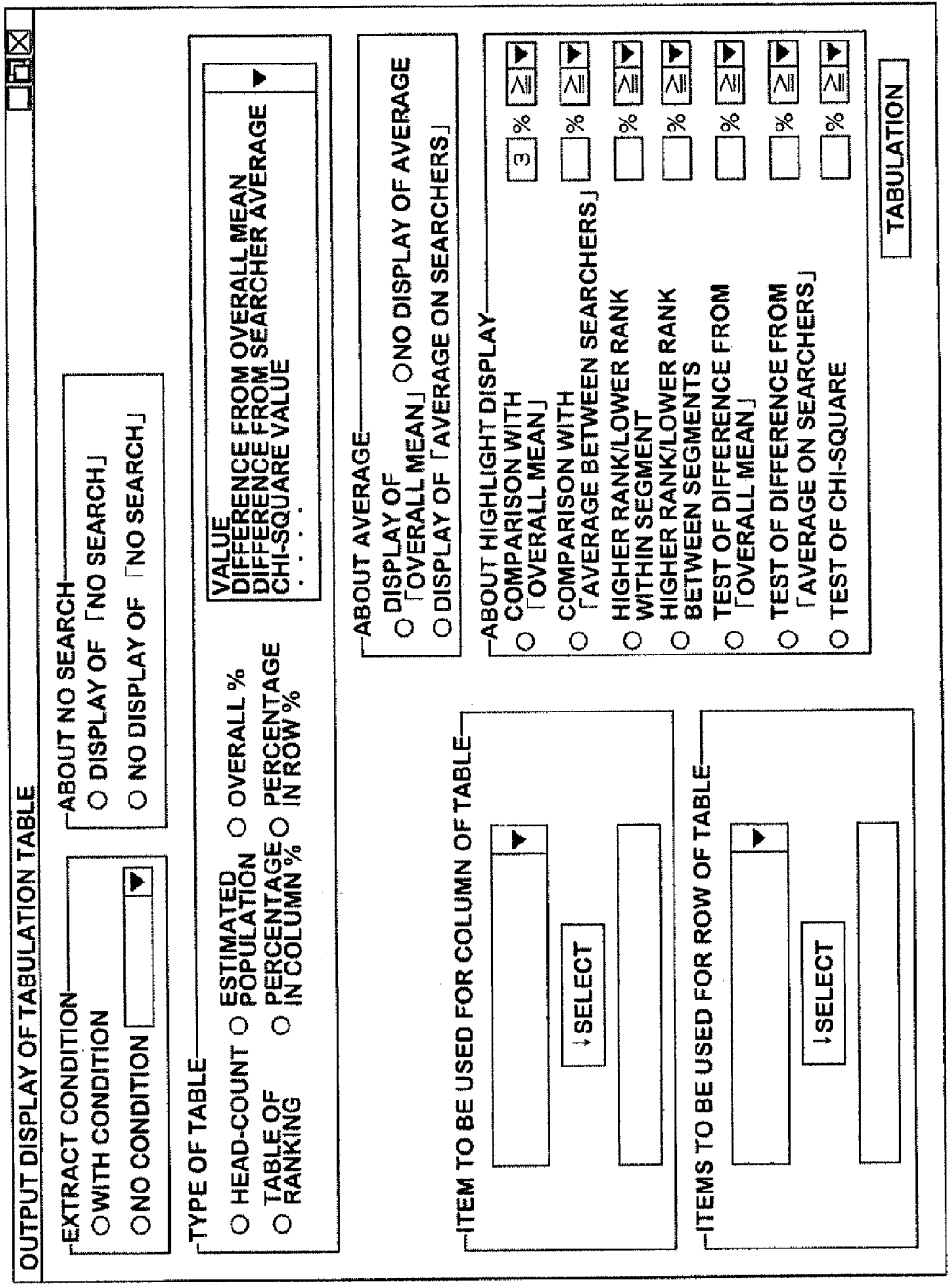
FIG. 49 is an example of an image into which conditions for carrying out cross tabulation processing.

In FIG. 49, the term "extracting conditions" is a pull-down menu used in the case when limited extraction only from "teens" respondents out of items on row of table is desired for example, the operator selects "with conditions" and further selects "teens" from another pull-down menu.

The option "type of table" is a display format for value of each cell, and each of radio buttons such as "head-count" "estimated population", "overall %", "table of ranking", and "percentage in row" is selected where the operator respectively desires to display absolute head-count, to obtain estimated value representing how many people who belong to each item nationwide using the ratio of the total number of respondents (population) out of the entire population, to display percentage of people including non-searcher and to obtain the rankling of the item. In the case of selecting the "table of ranking", criteria for the ranking (such as value, difference from overall mean, difference from searcher average, chi-square value . . . ) and so on may be selected from the pull-down menu. The option "percentage in row" is selected when the operator desires to display in a ratio where the grand total of a specific item assigned on the row of table is assumed as 100.

The options "items to be used for column of table" and "items to be used for row of table" may respectively selected from pull-down menus. In an example shown in FIGS. 46 and 46*b*, the option "items to be used for column of table" represent search timing and the option "items to be used for row of table" are questionnaire items such as gender, age and so on.

For the option "about average", one of "(overall mean)" display, "(average) non display" and "(average between searchers) display" is selected.

For the option "about marking", criteria for judgment and threshold values for carrying out the highlight display shown in FIG. 49 are input. Upon selecting one of these, "equal or more than" and "equal or less than" and so on may also be selected as threshold values in addition to actual values.

The CPU 23 stores the instructed conditions on each of options ("extracting conditions", "type of table", "items to be used for column of table", "items to be used for row of table", "about average", "about marking") input on the instruction input window shown in FIG. 49 and may determines output display format of a tabulation table prior to step S109 in FIG. 41.

Display in ranking format will be described using FIG. 50. FIG. 50 is an example of sorting the items having values reducing the average value therefrom in descending order in segments C1 and C2 on the tabulation results of FIG. 48. FIG. 51 is another example of sorting only the items for segments C1 to C5. Hence, a person makes analysis can recognize the characteristics of users belonging to respective segment with much higher reliability by sorting positions in accordance with the values reducing the average value therefrom.

Further, in the embodiments described above, tabulation is performed by grouping the questionnaire results conducted to all the participants for each user using the search timings, such tabulation may also be carried out by initially grouping the users belonging to a specific group to be questionnaire responders and use the questionnaire results responded by the responders. For example, since users belonging to the segment C1 and conduct their searches at early stage, there might be a case in which it is desired to carry out a questionnaire is desired only to such users. In that case, more efficient questionnaire may be carried out by narrowing the population down to a smaller number than performing the questionnaire to all the users.

In the above described embodiment, the case where information for specifying target attribution and data on search term are stored in the questionnaire result analysis supporting device has been described as an example, it is possible to configure such that one of these data or both data is stored in another computer (for example, a center server) and reads out such data through a network. Further, such device can also be realized as a computer system configured by three computers two of which are divided ones from the center server.

For acquiring search results, it is possible to configure such that installation of a program for storing history of using search engines within the user's PC is required during the user registration, storing search term(s) and search at each search and send them to the center server regularly or irregularly. In this way, well-known technique can be employed for the method of collecting search results.

In the above described embodiment, the operator inputs the search term(s), the search term(s) belonging to a certain category corresponding to the name of advertising object can automatically be determined by storing search term(s) that is classified into categories. Further, they may be displayed as candidates and can be selected one of these.

Alternatively, its search term may be specified by carrying out the steps of storing the variation history of search number, displaying the history and selecting any of the history.

Segment may be determined using a segment determination rule(s) for segmenting into a predetermined number, wherein the segment determination rule(s) is stored.

The segment may be determined using segment of search term for category to which a search term(s) belong, wherein the search term(s) classified into category is stored.

The search terms specifying means may automatically specify a search term(s) including the variation history of search number similar to that of the name of advertising object being inputted when the name of advertising object is input. In addition, instead of automatic specification, it is possible to provide a search term(s) selected to the advertising medium data determination means as a word to the name of advertising object.

In this embodiment, days are used for basis of various time frames, but week, month, or even morning, afternoon, hours (for example, three hour basis) and so on may arbitrarily be applied.

Also, segment is specified in the form of mm/dd-to-mm/dd, but it is possible to specify segment relatively in a relative period such as one month later from a certain date.

As to tabulation segment, arbitrarily time intervals such as one month and so on may be set. Further, search date and hour of population may also be set arbitrarily. For example, monthly tabulation will be carried out by setting the population search date arbitrarily as January 1 and the tabulation segment in one month. This enable to correspondence to a segment in a calendar-form.

(1) A questionnaire result analysis supporting device comprising: 1) questionnaire response information storage means for storing correspondently with respondents' ID questionnaire response information responded to one of corresponding to plural items and not corresponding thereto; 2) search term storage means for storing a search term used for conducting a search at a specific search site correspondently with its search timing and a searcher's ID; 3) determination means for extracting from the search term storage means search timing of the search term for searcher's ID when a search term is provided as a search condition, segmenting the extracted search timing into a predetermined number in chronological order and determining a user identified by a respondent's ID corresponding to the searcher's ID as a user in each of the segments; and 4) tabulation means for arranging each of the segments in a direction of first axis of a cross tabulation for the items being responded as applied out of the questionnaire response information stored in the questionnaire response information means for arranging each of the items of the questionnaire response information in a direction of second axis of the cross tabulation and carrying out the cross tabulation for number of person belonging to the each item in each of the segments.

Cross tabulation of the questionnaire results can be performed according to the search timing of a search term.

(2) The questionnaire result analysis supporting device according to the present invention, wherein the tabulation means carries out a cross tabulation by additionally arranging a user who does not conduct the search in a direction of the first axis as a segment of non-search user. In this way, cross tabulation of the questionnaire results can be performed according to the search timing of a search term in comparison with the user who does not conduct the search.

(3) The questionnaire result analysis supporting device according to the present invention, wherein the tabulation means carries out normalization a value of cell belonging to a specific item out of each cell arranged in a direction of the first axis on a cross-tabulated table in accordance with a value of a cell belonging to the item. In this way, the values of cells belonging to a specific item arranged in a direction of the first axis can be compared. Further, characteristic analysis among users at different search timings can be made by carrying out comparison in the specific item arranged in a direction of the first axis plural times.

(4) The questionnaire result analysis supporting device according to the present invention, wherein the tabulation means carries out normalization a value of cell belonging to a specific item out of each cell arranged in a direction of the second axis on a cross-tabulated table in accordance with a value of a cell belonging to the item. In this way, the values of cells belonging to a specific item arranged in a direction of the second axis can be compared. Further, characteristic analysis among users at different search timings can be made by carrying out comparison in the specific item arranged in a direction of the second axis plural times.

(5) The questionnaire result analysis supporting device based on the present invention, wherein the generating means generates data arranging therein cells belonging to the extracted items by extracting equal or more than one or two items specified by the operator out of the arranged items in either the first or the second axis, for the tabulation results. In this way, displays on which items desired by a person who makes analysis for extraction, can be carried out.

(6) The questionnaire result analysis supporting device according to the present invention, comprising: generating means for generating display data arranging therein cells belonging to extracted items by extracting equal or more than one or two items specified by an operator out of arranged items in the first axis, for the tabulation results. The generating means generates data for performing highlighted display enabling easy recognition of a cell(s) having unique value(s) from other cell(s) by comparing the value of cell(s) arranged in a direction of the first axis with that arranged in a direction of the second axis. In this way, highlighted display enabling easy recognition cells having unique value(s) from other cell(s) out of cell(s) belonging to specific item(s) arranged in a direction of the first axis. Further, characteristic analysis between users who conduct search for different item(s) at different period(s) can easily be performed when equal or more than two items are extracted.

(7) The questionnaire result analysis supporting device according to the present invention, comprising: generating means for generating display data arranging therein cells belonging to extracted items by extracting equal or more than one or two items specified by an operator out of arranged items in the first axis, for the tabulation results in which generating means generates ranking processing data for arranging in the order of having unique value(s) from other cell(s) by comparing the value of cells) arranged in a direction of the first axis with that arranged in a direction of the second axis. In this way, cells having unique value(s) from other cell(s) out of cell(s) belonging to specific item(s) arranged in a direction of the first axis can be displayed. Further, characteristic analysis between users who conduct search for different item(s) at different period(s) can easily be performed when equal or more than two items are extracted.

(8) The questionnaire result analysis supporting device according to the present invention, comprising: generating means for generating display data arranging therein cells belonging to extracted items by extracting equal or more than one or two items specified by an operator out of arranged items in the second axis, for the tabulation results. The generating means generates data for performing highlighted display enabling easy recognition of a cell(s) having unique value(s) from other cell(s) by comparing the value of cell(s) arranged in a direction of the second axis with that arranged in a direction of the first axis. In this way, highlighted display enabling easy recognition cells having unique value(s) from other cell(s) out of cell(s) belonging to specific item(s) arranged in a direction of the second axis. Further, characteristic analysis between users who conduct search for different item(s) at different period(s) can easily be performed when equal or more than two items are extracted.

(9) The questionnaire result analysis supporting device according to the present invention, comprising: generating means for generating display data arranging therein cells belonging to extracted items by extracting equal or more than one or two items specified by an operator out of arranged items in the second axis, for the tabulation results. The generating means generates ranking processing data for arranging in the order of having unique value(s) from other cell(s) by comparing the value of cell(s) arranged in a direction of the second axis with that arranged in a direction of the first axis. In this way, cells having unique value(s) from other cell(s) out of cell(s) belonging to specific item(s) arranged in a direction of the second axis can be displayed. Further, characteristic analysis between users who conduct search for different item(s) at different period(s) can easily be performed when equal or more than two items are extracted.

10) A method of analyzing questionnaire result with a computer according to the present invention comprising the steps of: storing within a computer correspondently with respondents' ID questionnaire response information responded to one of corresponding to plural items and not corresponding thereto; storing within a storage part a search term used for conducting a search at a specific search site correspondently with its search timing and a searcher's ID; the computer extracting from the search term storage means search timing of the search term for searcher's ID when a search term is provided as a search condition, segmenting the extracted search timing into a predetermined number in chronological order, determining a user identified by a respondent's ID corresponding to the searcher's ID as a user in each of the segments, and arranging each of the segments in a direction of first axis of a cross tabulation for the items being responded as applied out of the questionnaire response information stored in the questionnaire response information means and arranging each of the items of the questionnaire response information in a direction of second axis of the cross tabulation and carrying out the cross tabulation for number of person belonging to the each item in each of the segments.

Cross tabulation of the questionnaire results can be performed based on the search timing of a search term.

(11) A questionnaire result analysis program according to the present invention being a program for executing a computer the steps of 1) storing correspondently with respondents' ID questionnaire response information responded to one of corresponding to plural items and not corresponding thereto and storing within a storage part a search term used for conducting a search at a specific search site correspondently with its search timing and a searcher's ID; 2) extracting from the search term storage means search timing of the search term for searcher's ID when a search term is provided as a search condition, segmenting the extracted search timing into a predetermined number in chronological order, determining a user identified by a respondent's ID corresponding to the searcher's ID as a user in each of the segments; and 3) arranging each of the segments in a direction of first axis of a cross tabulation for the items being responded as applied out of the questionnaire response information stored in the questionnaire response information means and arranging each of the items of the questionnaire response information in a direction of second axis of the cross tabulation and carrying out the cross tabulation for number of person belonging to the each item in each of the segments.

(12) A questionnaire result analysis system according to the present invention, the system executing the steps of: storing within a first computer correspondently with respondents' ID questionnaire response information responded to one of corresponding to plural items and not corresponding thereto;

storing within a second computer a search term used for conducting a search at a specific search site correspondently with its search timing and a searcher's ID; and extracting by a third computer from the second computer search timing of the search term for searcher's ID when a search term is provided as a search condition, segmenting the extracted search timing into a predetermined number in chronological order, determining a user identified by a respondent's ID corresponding to the searcher's ID as a user in each of the segments, and arranging each of the segments in a direction of first axis of a cross tabulation for the items being responded as applied out of the questionnaire response information stored in the first computer and arranging each of the items of the questionnaire response information in a direction of second axis of the cross tabulation, and carrying out the cross tabulation for number of person belonging to the each item in each of the segments; the third computer being connected to the first computer and the second computer.

Cross tabulation of the questionnaire results can be performed based on the search timing of a search term.

(13) A questionnaire participant determination device according to the present invention comprising: 1) questionnaire response information storage means for storing correspondently with respondents' ID questionnaire response information responded to one of corresponding to plural items and not corresponding thereto; 2) search term storage means for storing a search term used for conducting a search at a specific search site correspondently with its search timing and a searcher's ID; 3) determination means for extracting from the search term storage means search timing of the search term for searcher's ID when a search term is provided as a search condition, segmenting the extracted search timing into a predetermined number in chronological order, determining a user identified by a respondent's ID corresponding to the searcher's ID as a user in each of the segments; and 4) questionnaire participant determination means for determining a searcher's ID belonging to the segment as a questionnaire participant when any of the segment is specified.

In this way, a questionnaire to prospectively limited participants can be carried out based on the search timing of a search term. Hence, a questionnaire for its purpose can be carried out by limiting participants thereof.

In the above described embodiments, items assigned on the column of table and items assigned on the row of table are respectively employed as the first axis and the second axis of the cross tabulation table, "the column of table" and "the row of table" are interchangeable with each other.

The term "a cell(s) having unique value(s)" refers to the cases such that the value representing whether or not the items of cross tabulation result being statistically significant and the value(s) subtracting the average value of each segment from the value(s) of each cell is much larger value(s) and much smaller value(s) than that of other cell(s). The terms also refer to the cell having a larger chi-square value(s) for the item(s) of the cross tabulation result.

In the above disclosure, the present invention has been described as preferred embodiments, each of the terms therein is used for illustrative only and is not limitative, such terms may be amended without apart from the scope of the invention being limited solely by the claims appended hereto.

What is claimed is:

1. An advertising medium determination device comprising:
    target specifying information storage means for storing correspondently with searchers' identification information for specifying target attribution including information for specifying information delivery medium of an object to contact with; search term storage means for correspondently storing searchers' identifications, timing of search and search terms used for the search;
    extraction means for extracting a timing of search for a search term for each searcher's identification from the search term storage means when the search term is provided as a search condition and segmenting the extracted search timing into a predetermined number in chronological order and extracting searcher's identification belonging to each segment;
    search number variation history calculation means for calculating variation history of search number representing chronological variation of the number of search for each search term stored in the search term storage means; and
    advertising medium data determination means for extracting candidates of information delivery medium for the each segment from the extracted each searcher's identification using information for specifying a target stored in the target specifying information storage means for determining one or more than two representation candidates of information delivery medium from the extracted candidates of information delivery medium, thereby determining the representation candidatures of information delivery medium arranged in chronological order as advertising medium data in a name of advertising object provided correspondently to the search term.

2. The advertising medium determination device according to claim 1, further comprising:
    search term specification means for specifying a search term corresponding to the name of advertising object and providing the specified search term to the extraction means while providing a term corresponding to the name of advertising object to the advertising medium data determination means when such term is provided thereto.

3. The advertising medium determination device according to claim 2, further comprising:
    search number variation history storage means for storing variation history of the number of search;
    wherein the search term specification means displays variation history for each of the search terms and when one of the histories is selected, its search term is specified.

4. The advertising medium determination device according to claim 2, further comprising:
    search number variation history calculation means for calculating variation history of search number representing chronological variation of the number of search for each search term stored in the search term storage means; and
    search number variation history storage means for storing variation history of the number of search;
    wherein when a name of advertising object is input as an object to be corrected the search term specification means specifies a search term that includes search number variation history similar to the search number variation history of the inputted name of advertising object and provides the specified search term to the advertising medium data determination means as the term corresponding to the name of advertising object.

5. The advertising medium determination device according to claim 2, further comprising:
    search number variation history calculation means for calculating variation history of search number representing chronological variation of the number of search for each search term stored in the search term storage means; and
    search number variation history storage means for storing variation history of the number of search;

wherein when a name of advertising object is input as an object to be corrected the search term specification means specifies a search term that includes search number variation history similar to the search number variation history of the inputted name of advertising object, displays the search number variation history of the specified search term, and when any search term is selected, provides the selected search term to the advertising medium data determination means as the term corresponding to the name of advertising object.

6. The advertising medium determination device according to claim 2,
wherein the search terms used as the search condition are a plurality of search terms combining one of logical and logical add or both of these, and
wherein the extraction means calculates a period from the beginning of search to the end of the search for each search term and extracts searcher's identification belonging to each segment by carrying out calculation based on the search condition.

7. The advertising medium determination device according to claim 6, wherein the calculation performed based on the search condition is a logical and operation to be provided.

8. The advertising medium determination device according to claim 6, wherein a logical and operation out of the calculations based on the search condition calculates the maximum value of a period.

9. The advertising medium determination device according to claim 6, wherein a logical and operation out of the operations based on the search condition
calculates the average value of a period.

10. The advertising medium determination device according to claim 6, wherein the extraction means carries out the calculation after normalization of the period about each of the obtained search terms on a search term to search term basis.

11. The advertising medium determination device according to claim 10, wherein the normalization is carried out through segmentation of the beginning of search
to the end of the search for each search term in a predetermined number and through a logical
and operation depending on to which segment the segmented frame belonging to.

12. The advertising medium determination device according to claim 11, wherein when data out of the normalized data of each of the search terms that is subject to logical and operation differs from other data equal or more than a predetermined threshold value, a logical and operation is carried out with ignoring such normalized data.

13. The advertising medium determination device according to claim 12, wherein when no search timing exists, a term such as differs from equal or more than a predetermined threshold value is used.

14. The advertising medium determination device according to claim 6, wherein when no search timing exists in a search term that is subject to a logical and operation, a logical and operation is carried out with ignoring of such search term if the number of such search is equal or less than a predetermined number.

15. An advertising medium determination device comprising:
extraction means for extracting from search term storage means storing therein a searcher's identification, the timing of search, and the term used for the search the timing of search for such search term for each searcher's identification, segmenting the extracted search timing for each searcher's identification into a predetermined number in chronological order and extracting searcher's identification in each segment;
search number variation history calculation means for calculating variation history of search number representing chronological variation of the number of search for each search term stored in the search term storage means; and
advertising medium data determination means for extracting information on candidate of information delivery medium for the each segment from the extracted each searcher's identification using information for specifying target attribution including information for specifying information delivery medium of an object to contact that is stored correspondently with searchers' identification, determining one or more than two representative candidates of information delivery medium from the extracted candidates of information delivery medium, thereby determining the candidate of information delivery medium arranged in chronological order of the each segment as advertising medium data in the name of advertising object provided correspondently to the search term.

16. A computer-readable recording medium storing a program for executing a computer the Steps of:
extracting from search term storage means storing therein a searcher's identification, the timing of search, and the term used for the search the timing of search for such search term for each searcher's identification, segmenting the extracted search timing for each searcher's identification into a predetermined number in chronological order and extracting searcher's identification in each segment;
calculating variation history of search number representing chronological variation of the number of search for each search term stored in the search term storage means; and
extracting information on candidate of information delivery medium for the each segment from the extracted each searcher's identification using information for specifying target attribution including information for specifying information delivery medium of an object to contact that is stored correspondently with searchers' identification, determining one or more than two representative candidates of information delivery medium from the extracted candidates of information delivery medium, thereby determining the candidate of information delivery medium arranged in chronological order of the each segment as advertising medium data in the name of advertising object provided correspondently to the search term.

17. A method of determining advertising medium with computers, the method comprising the step of:
storing within a first computer 1) information for specifying target attribution including information for specifying information delivery medium of an object to contact with correspondently with searchers' identification and 2) data on a search term that corresponds a searcher's identification performing a search, a timing of the search, and the search term one another;
wherein when a search term is provided, a second computer extracts from the first computer the timing of search for such search term, segments the extracted search timing for each searcher's identification into a predetermined number in chronological order and extracts searcher's identification in each segment;
wherein the second computer calculates variation history of search number representing chronological variation of the number of search for each search term stored in the search term storage means;

and wherein the second computer extracts from the extracted searcher's identification candidates of information delivery medium for the each segment using the stored information for specifying target, determines one or more than two representative candidates of information delivery medium from the extracted candidates of information delivery medium, thereby the candidate(s) of information delivery medium arranged in chronological order of the each segment is determined as advertising medium data in the name of advertising object provided correspondently to the search term.

* * * * *